United States Patent
Pattan et al.

(10) Patent No.: US 11,974,195 B2
(45) Date of Patent: Apr. 30, 2024

(54) METHOD AND SYSTEM FOR HANDLING DYNAMIC GROUP CREATION IN V2X SYSTEM

(71) Applicant: Samsung Electronics Co., Ltd., Suwon-si (KR)

(72) Inventors: Basavaraj Jayawant Pattan, Bangalore (IN); Nishant Gupta, Sitapur (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 17/360,146

(22) Filed: Jun. 28, 2021

(65) Prior Publication Data

US 2021/0329422 A1 Oct. 21, 2021

Related U.S. Application Data

(63) Continuation of application No. 16/410,286, filed on May 13, 2019, now Pat. No. 11,051,136.

(30) Foreign Application Priority Data

| May 11, 2018 | (IN) | ............................. 201841017872 |
| Jul. 13, 2018 | (IN) | ............................. 201841026329 |
| May 8, 2019 | (IN) | ............................. 2018 41017872 |

(51) Int. Cl.
*H04W 4/08* (2009.01)
*H04L 67/55* (2022.01)
*H04W 4/40* (2018.01)

(52) U.S. Cl.
CPC .............. *H04W 4/08* (2013.01); *H04L 67/55* (2022.05); *H04W 4/40* (2018.02)

(58) Field of Classification Search
CPC .......... H04W 4/08; H04W 4/40; H04L 67/55; H04L 67/12
See application file for complete search history.

(56) References Cited

U.S. PATENT DOCUMENTS 10,687,199 B2   6/2020  Kim et al.
11,477,623 B2 * 10/2022  Perras ..................... H04W 4/50
(Continued)

FOREIGN PATENT DOCUMENTS

| CN | 106211087 A | 12/2016 |
| CN | 106331978 A | 1/2017 |

(Continued)

OTHER PUBLICATIONS

Huawei et al., "Solution to dynamic group management", S6-180312, 3GPP TSGSA WG6 Meeting #22, Sophia Antipolis, France, Mar. 5-9, 2018.

(Continued)

Primary Examiner — Md K Talukder
(74) Attorney, Agent, or Firm — Jefferson IP Law, LLP

(57) ABSTRACT

A method and apparatus for handling dynamic group creation in a vehicle to everything (V2X) system is provided. The method includes assigning, by a first server, a link layer identifier corresponding to a dynamic group information, sending, by the first server, a push request including the link layer identifier corresponding to the dynamic group information to a first V2X user equipment (UE) from a plurality of V2X UEs, receiving, by the first V2X UE, the link layer identifier corresponding to the dynamic group information, storing, by the first V2X UE, the link layer identifier corresponding to the dynamic group information.

14 Claims, 32 Drawing Sheets

(56) References Cited

U.S. PATENT DOCUMENTS

| | | | |
|---|---|---|---|
| 2013/0046841 A1 | 2/2013 | Park et al. | |
| 2015/0078301 A1 | 3/2015 | Toth et al. | |
| 2015/0312404 A1* | 10/2015 | Abramson | H04W 8/02 |
| | | | 455/418 |
| 2018/0279095 A1* | 9/2018 | Xu | H04W 28/0215 |
| 2018/0315313 A1* | 11/2018 | Klochikhin | G08G 1/146 |
| 2019/0045405 A1* | 2/2019 | Byun | H04W 36/14 |
| 2019/0124489 A1 | 4/2019 | Ahmad et al. | |
| 2019/0230723 A1 | 7/2019 | Kim et al. | |
| 2020/0021451 A1* | 1/2020 | Pinheiro | H04W 4/40 |
| 2020/0337018 A1* | 10/2020 | Feng | H04W 4/80 |
| 2020/0389833 A1* | 12/2020 | Itou | H04B 17/318 |
| 2021/0329422 A1* | 10/2021 | Pattan | H04L 67/55 |

FOREIGN PATENT DOCUMENTS

| | | |
|---|---|---|
| CN | 107710794 A | 2/2018 |
| EP | 3 316 553 A1 | 5/2018 |
| WO | 2010/098554 A2 | 9/2010 |

OTHER PUBLICATIONS

Huawei et al., "Pseudo-CR on Solution on supporting group communication", S6-180736, 3GPP TSG-SA WG6 Meeting #23, Newport Beach, CA, USA, Apr. 16-20, 2018.

International Search Report dated Aug. 29, 2019, issued in International Patent Application No. PCT/KR2019/005703.

3GPP TR 23.795 V1.1.0, Technical Specification Group Services and System Aspects, Jul. 2018.

3GPP TR 23.795 V0.3.0, Pseudo-CR on V2X dynamic groups for platooning, S6-180956, May 21-25, 2018.

3GPP TR 23.795 V0.4.0, Pseudo-CR on V2X dynamic group formation—PC5, S6-181092, Jul. 23-27, 2018.

3GPP TR 23.795 V0.4.0, Pseudo-CR on V2X dynamic group formation—Uu, S6-181091, Jul. 23-27, 2018.

Extended European Search Report dated Feb. 5, 2021, issued in a counterpart European Application No. 19799551.7-1213 / 3782383.

Huawei, Hisilicon; 3GPP TSG-SA WG6 Meeting #22; Proposal for Solution on V2X application layer functional model S6-180417, XP051411871; Agenda item: 9.2; Mar. 2018, Sophia Antipolis, France.

Huawei, Hisilicon; Pseudo-CR on Solution on supporting group communication; 3GPP TSG-SA WG6 Meeting #23 S6-180593, XP051438735 Agenda item: 10.2; Apr. 2018, Newport Beach, CA, USA.

3rd Generation Partnership Project; Technical Specification Group Services and System Aspects; Study on application layer support for V2X services; (Release 16); V0.3.0; Apr. 2018.

Chinese Office Action dated Nov. 26, 2021, issued in a counterpart Chinese Application No. 201980045582.6.

European Office Action dated Mar. 9, 2022, issued in a counterpart European Application No. 19 799 551.7.

European Office Action dated Mar. 10, 2023, issued in European Patent Application No. 19799551.7.

European Office Action dated Dec. 15, 2023, issued in European Patent Application No. 19799551.7.

* cited by examiner

METHOD AND SYSTEM FOR HANDLING DYNAMIC GROUP CREATION IN V2X SYSTEM

CROSS-REFERENCE TO RELATED APPLICATION(S)

This application is a continuation application of prior application Ser. No. 16/410,286, filed on May 13, 2019, which will be issued as U.S. Pat. No. 11,051,136 on Jun. 29, 2021, which is based on and claimed priority under 35 U.S.C. § 119(a) of an Indian patent application number 201841017872, filed on May 11, 2018, in the Indian Patent Office, and of an Indian patent application number 201841026329, filed on Jul. 13, 2018, in the Indian Patent Office, and of an Indian patent application number 201841017872, filed on May 8, 2019, in the Indian Patent Office, the disclosure of each of which is incorporated by reference herein in its entirety.

BACKGROUND

1. Field

The disclosure relates to a vehicle to everything (V2X) communication system. More particularly, the disclosure relates to a method and system for handling dynamic group creation in the V2X communication system.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for handling dynamic group creation in a vehicle to everything (V2X) system.

Additional aspects will be set forth in part in the description which follows and, in part, will be apparent from the description, or may be learned by practice of the presented embodiments.

In accordance with an aspect of the disclosure, a method for handling dynamic group creation in a V2X system is provided. The method includes assigning, by a first server, a link layer identifier corresponding to a dynamic group information. Further, the method includes sending, by the first server, a push request including the link layer identifier corresponding to the dynamic group information to a first V2X user equipment (UE) from a plurality of V2X UEs. Further, the method includes receiving, by the first V2X UE, the link layer identifier corresponding to the dynamic group information. Further, the method includes storing, by the first V2X UE, the link layer identifier corresponding to the dynamic group information.

In an embodiment, assigning, by the first server, the link layer identifier corresponding to the dynamic group information includes receiving, by the first server, a dynamic group configuration request corresponding to the dynamic group information from a second server, and assigning, by the first server, the link layer identifier corresponding to the dynamic group information based on the dynamic group configuration request.

In an embodiment, receiving, by the first V2X UE, the link layer identifier corresponding to the dynamic group information includes receiving, by the first V2X UE, a dynamic group configuration request corresponding to the dynamic group information, and receiving, by the first V2X UE, the link layer identifier corresponding to the dynamic group information based on the dynamic group configuration request.

The method further includes broadcasting, by the first V2X UE, the link layer identifier corresponding to the dynamic group information to at least one second V2X UE from the plurality of V2X UEs in the V2X system.

The method further includes receiving, by the at least one second V2X UE, the link layer identifier corresponding to the dynamic group information from the first V2X UE. Further, the method includes storing, by the at least one second V2X UE, the dynamic group information and the link layer identifier.

The method further includes determining, by the at least one second V2X UE, whether the dynamic group information corresponding to at least one dynamic group is available in the V2X system. Further, the method includes sending, by the at least one second V2X UE, a dynamic group join request message corresponding to the dynamic group information to the second server in response to the dynamic group information corresponding to at least one dynamic group is available in the V2X system. Further, the method includes receiving, by the at least one second V2X UE, a dynamic group join response message corresponding to the dynamic group information from the second server. Further, the method includes establishing, by the at least one second V2X UE, dynamic group communication with the first V2X UE in the V2X system over a first communication interface.

The method further includes determining, by the at least one second V2X UE, whether the at least one second V2X UE is in out of service area in the V2X system. Further, the method includes continuing, by the at least one second V2X UE, the dynamic group communication with the first V2X UE by switching to a second communication interface from the first communication interface.

In an embodiment, the dynamic group information comprises at least one of a dynamic group identifier (ID), a group definition, or a group leader.

In an embodiment, the link layer identifier is set to a ProSe Layer-2 Group ID obtained from a link layer identifier pool.

In an embodiment, the first communication interface is a Uu interface and the second communication interface is a PC5 interface.

In accordance with another aspect of the disclosure, a method for handling dynamic group creation in a V2X system is provided. The method includes receiving, by a first server, a dynamic group configuration request corresponding to dynamic group information from a second server. Further, the method includes assigning, by the first server, a link layer identifier corresponding to the dynamic group information. Further, the method includes sending, by the first server, a push request including the link layer identifier corresponding to the dynamic group information to a first V2X UE from a plurality of V2X UEs.

In accordance with another aspect of the disclosure, a method for handling dynamic group creation in a V2X system is provided. The method includes receiving, by a first V2X UE from a plurality of V2X UEs, a push request including a link layer identifier corresponding to dynamic group information from a first server. Further, the method includes storing, by the first V2X UE, the link layer identifier corresponding to the dynamic group information. Further, the method includes broadcasting, by the first V2X UE, the link layer identifier corresponding to the dynamic group information to at least one second V2X UE from the plurality of V2X UEs in the V2X system.

In accordance with another aspect of the disclosure, a method for handling dynamic group creation in a V2X system is provided. The method includes receiving, by a first V2X UE, a link layer identifier corresponding to dynamic group information. Further, the method includes storing, by the first V2X UE, the link layer identifier corresponding to the dynamic group information. Further, the method includes broadcasting, by the first V2X UE, the link layer identifier corresponding to the dynamic group information to at least one second V2X UE from the plurality of V2X UEs in the V2X system. Further, the method includes establishing, by the first V2X UE, the dynamic group communication with the at least one second V2X UE based on the dynamic group information.

Accordingly, the embodiments herein disclose a V2X system for handling dynamic group creation. A first server is configured to receive a dynamic group configuration request corresponding to dynamic group information from a second server. Further, the first server is configured to assign a link layer identifier corresponding to the dynamic group information. A first server is configured to send a push request including the link layer identifier corresponding to the dynamic group information to a first V2X UE from a plurality of V2X UEs. The first V2X UE is configured to receive the link layer identifier corresponding to the dynamic group information and store the link layer identifier corresponding to the dynamic group information.

In accordance with another aspect of the disclosure, a server for handling dynamic group creation in a V2X system is provided. The server includes a processor coupled with a memory. The processor is configured to receive a dynamic group configuration request corresponding to dynamic group information from another server. Further, the processor is configured to assign a link layer identifier corresponding to the dynamic group information. Further, the processor is configured to send a push request including the link layer identifier corresponding to the dynamic group information to a first V2X UE from a plurality of V2X UEs.

In accordance with another aspect of the disclosure, a V2X UE for handling dynamic group creation in a V2X system is provided. The V2X UE includes a processor coupled with a memory. The processor is configured to receive the push request including a link layer identifier corresponding to dynamic group information from a server. Further, the processor is configured to store the link layer identifier corresponding to the dynamic group information. The processor is configured to broadcast the link layer identifier corresponding to the dynamic group information to at least one second V2X UE from the plurality of V2X UEs in the V2X system. The processor is configured to establish dynamic group communication with the first V2X UE in the V2X system over a first communication interface.

In accordance with another aspect of the disclosure, a V2X UE for handling dynamic group creation in a V2X system is provided. The V2X UE includes a processor coupled with a memory. The processor is configured to receive a link layer identifier corresponding to dynamic group information. The processor is configured to storing, by the first V2X UE, the link layer identifier corresponding to the dynamic group information. The processor is configured to broadcast the link layer identifier corresponding to the dynamic group information to at least one second V2X UE from the plurality of V2X UEs in the V2X system. The processor is configured to establish the dynamic group communication with the at least one second V2X UE based on the dynamic group information.

Other aspects, advantages, and salient features of the disclosure will become apparent to those skilled in the art from the following detailed description, which taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
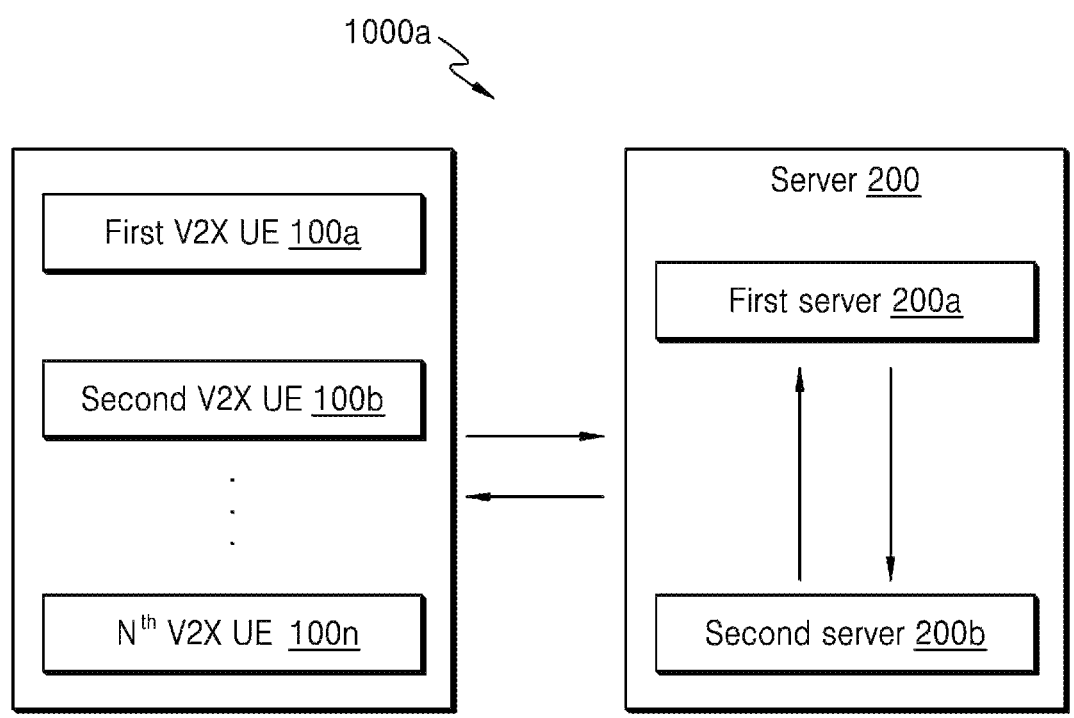
FIG. 1 illustrates an overview of a vehicle to everything (V2X) system for handling dynamic group creation, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Vehicular communication is expected to contribute significantly in development of a transport system. Various wireless communication systems exist, which enables a wide range of applications and use cases in a vehicular environment such as a cooperative collision warning or an autonomous driving. Vehicle to everything (V2X) applications, referred to as V2X, contain vehicle-to-vehicle (V2V), vehicle-to-infrastructure (V2I), vehicle-to-network (V2N), vehicle-to-pedestrian (V2P). These four types of the V2X applications can use "co-operative awareness" to provide more intelligent services for end-users. The transportation services and message sets associated with the transportation services have been defined in various automotive standards development organizations (SDOs) and $3^{rd}$ generation partnership project (3GPP) is handling a transport of the messages. Different V2X scenarios (e.g., Vehicles Platooning, Advanced Driving, Extended Sensors, Remote Driving, or the like.) require the transport of V2X messages with a different performance requirements for the 3GPP system.

A concept in which the vehicles are driving as highly cooperative groups, using information and communication technology, is called vehicle platooning. All the vehicles in a platoon receive a periodic data from a leading vehicle, in order to carry on platoon operations. This information allows a distance between vehicles to become extremely small, i.e., the gap distance translated to time can be very low (sub second), effectively increase the highway capacity, reduce congestion and decrease fuel consumption.

While the vehicle platoon approaches found in existing methods are generally with organized platoons for fleet management i.e., platoon formation involves pre-determined set of vehicles including platoon leader identification.

Thus, it is desired to address the above mentioned disadvantages or other shortcomings or at least provide a useful alternative.

The terms "link layer identifier" and "PC5 parameter" are used interchangeably in the disclosure. The terms "V2X on-network" and "on-network" are used interchangeably in the disclosure. The terms "V2X off-network" and "off-network" are used interchangeably in the disclosure.

The principal aspect of the embodiments herein is to provide a method and system for dynamic group management and communication in a V2X system.

Another aspect of the embodiments herein is to provide a dynamic platoon formation and management (e.g., joining a platoon, leaving a platoon, splitting platoon, merging platoons or the like).

Another aspect of the disclosure is to determine when a new platoon leader is required for the platoons.

Another aspect of the disclosure is to announce new leader for the platoons.

The embodiments herein disclose a method for handling dynamic group creation in a V2X system. The method includes receiving, by a first server, a dynamic group configuration request corresponding to dynamic group information from a second server. Further, the method includes assigning, by the first server, a link layer identifier corresponding to the dynamic group information. Further, the method includes sending, by the first server, a push request including the link layer identifier corresponding to the dynamic group information to a first V2X UE from a plurality of V2X UEs. Further, the method includes receiving, by the first V2X UE, the link layer identifier corresponding to the dynamic group information. Further, the method includes storing, by the first V2X UE, the link layer identifier corresponding to the dynamic group information.

Unlike conventional methods and systems, the proposed method can be used to form the platoons in an ad-hoc manner by dynamically determining the platoon leader. An on-network dynamic platoons are formed according to the proposed method, where a V2X user should join a platoon in order to communicate with platoon members. A platoon member can leave the platoon at any time and will not able to communicate further within that platoon. The platoon is dissolved when there are no platoon members left in the platoon to communicate. Two or more platoons can be merged as necessary, which might result in a new Platoon leader announcement. Similarly the platoon can be split into two or more and results in determining the Platoon leader for each split platoon.

In the proposed methods, the dynamic groups can be formed for a specific purpose decided at an application layer by the V2X system. However the members of a dynamic groups are determined dynamically (with the assistance of a V2X application server or independently by the V2X UEs when they are not connected to a network) during an operation. The proposed system supports an application layer for forming the V2X dynamic groups by including the V2X UEs to the group, determined in an ad-hoc fashion. In V2X dynamic groups, the group management operations that need to be supported include adding or removing members of the group, splitting or merging of groups.

Further, the system enables application layer V2X dynamic group formation and communication. For V2X dynamic group formation with the V2X UEs in Uu communication range, the system provides support to identify V2X UEs from one or more PLMNs, belonging to a dynamic group. Further, the system provides support to provision PC5 parameters enabling dynamic group communication continuity over V5. Further, the system provides support to dynamic group management (adding or removing members, split or merge dynamic groups).

For V2X dynamic groups formed with the V2X UEs in PC5 communication range, the system provides support to identify V2X UEs belonging to the dynamic group. Further, the system provides support to dynamic group management (adding or removing members, split or merge dynamic groups).

The proposed system supports an application layer for forming the V2X dynamic groups by including the V2X UEs (which could be from multiple PLMNs) to the group, determined in an ad-hoc fashion. Further, the system enables application layer V2X dynamic group formation and communication. For V2X dynamic group formation with the V2X UEs in Uu communication range, the system provides support to identify V2X UEs from one or more PLMNs. Further, the communication over Uu interface could be one of unicast or multicast or combination of both. Further, provides support to provision PC5 parameters enabling dynamic group communication continuity over V5. Further, provides support to dynamic group management. For V2X dynamic groups formed with the V2X UEs in PC5 communication range, the system provides support to identify V2X UEs belonging to the dynamic group. Further, provides support to enable dynamic group communication over V5. Further, provides support to dynamic group management. Group management operations include adding/removing group-members and splitting/merging of groups.

Some of the V2X scenarios require group-based communication (e.g. platooning). Unlike V2X communication for safety scenarios where all V2X UEs in the communication range receive broadcasted communication, the group-based communication is expected to be received only by the V2X UEs of the members of that group. Dynamic groups can be formed for a specific purpose decided at the application layer. However the members of a dynamic groups are determined dynamically (with the assistance of the V2X application server or independently by the V2X UEs when they are not connected to the network) during the operation. While the traditional vehicle platooning approaches are limited to organized platoons for fleet management i.e., platoon formation requires a pre-determined set of Following Vehicles and a Platoon Leader, the proposed system support the application layer for forming V2X dynamic groups by including the V2X UEs to the group, determined in an ad-hoc fashion. In V2X dynamic groups, the group management operations that need to be supported include adding or removing members of the group, splitting or merging of groups. Dynamic platoons can be formed with the assistance of a V2X application server (AS) or independently by the V2X UEs if they are not connected to the network.

Referring now to the drawings, and more particularly to FIGS. 1-16 and 18-31, where similar reference characters denote corresponding features consistently throughout the figures, there are shown preferred embodiments.

FIG. 1 illustrates an overview of a V2X system 1000a for handling dynamic group creation, according to an embodiment of the disclosure.

Referring to FIG. 1, the V2X system 1000a can be a V2X on-network. The V2X system 1000a includes a plurality of V2X UEs 100a-100n and a server 200 including a first server 200a and a second server 200b. The first server 200a is a V2X application enabler (VAE) server and the second server 200b is a V2X application specific server. The first server 200a is configured to receive a dynamic group configuration request corresponding to dynamic group information from the second server 200b. The dynamic group information comprises at least one of a dynamic group identifier (ID), a group definition, or a group leader.

Further, the first server 200a is configured to assign a link layer identifier corresponding to the dynamic group information. The link layer identifier can be a ProSe Layer-2 Group ID. The link layer identifier is set to a ProSe Layer-2 Group ID obtained from a link layer identifier pool. Further, the first server 200a is configured send a push request including the link layer identifier corresponding to the dynamic group information to a first V2X UE 100a from a plurality of V2X UEs 100a-100n. The first V2X UE 100a is configured to receive the link layer identifier corresponding to the dynamic group information and store the link layer identifier corresponding to the dynamic group information.

In an embodiment, the first V2X UE 100a is configured to broadcast the link layer identifier corresponding to the dynamic group information to at least one second V2X UE from the plurality of V2X UEs 100b-100n in the V2X system 1000.

In an embodiment, the at least one second V2X UE 100b is configured to receive the link layer identifier corresponding to the dynamic group information from the first V2X UE 100a. Further, the at least one second V2X UE 100b is configured to store the dynamic group information and the link layer identifier. Further, the at least one second V2X UE 100b is configured to determine whether the dynamic group information corresponding to at least one dynamic group is available in the V2X system 1000. Further, the at least one second V2X UE 100b is configured to send a dynamic group join request message corresponding to the dynamic group information to the second server 200b. Further, the at least one second V2X UE 100b is configured to receive a dynamic group join response message corresponding to the dynamic group information from the second server 200b. Further, the at least one second V2X UE 100b is configured to establish dynamic group communication with the first V2X UE 100a in the V2X system 1000 over a first communication interface.

In an embodiment, the at least one second V2X UE 100b is configured to determine whether the at least one second V2X UE is in out of service area in the V2X system 1000 and continue the dynamic group communication with the first V2X UE 100a by switching to a second communication interface from the first communication interface. The first communication interface can be a Uu interface and the second communication interface can be a PC5 interface.

Figure 2:
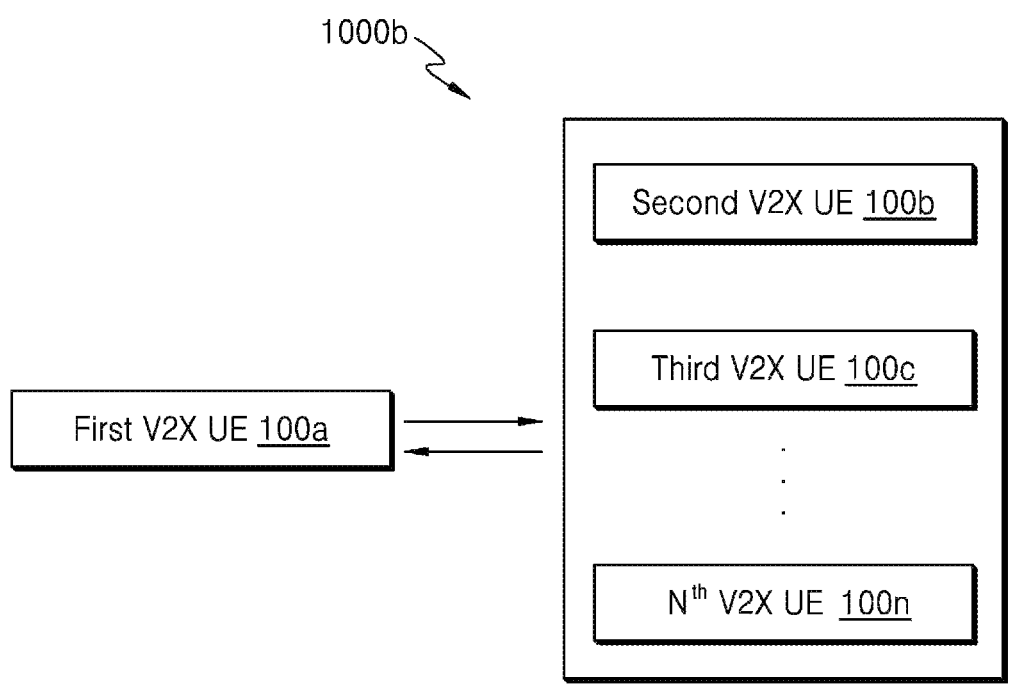
FIG. 2 illustrates another overview of a V2X system for handling dynamic group creation, according to an embodiment of the disclosure.

FIG. 2 illustrates another overview of a V2X system for handling dynamic group creation, according to an embodiment of the disclosure.

Referring to FIG. 2, the V2X system 1000b can be a V2X off-network. In an embodiment, the V2X system 1000b includes a plurality of V2X UEs 100a-100n. The first V2X UE 100a from the plurality of V2X UEs 100a-100n configures the dynamic group corresponding to dynamic group information. The first V2X UE 100a generates the link layer identifier from at least one of the link layer identifier pool corresponding to the dynamic group information or the link layer identifier rule. The first V2X UE 100a sends a push request including the link layer identifier corresponding to the dynamic group information to at least one second V2X UE from a plurality of V2X UEs 100a-100n. The at least one second V2X UE 100b configured to receive the link layer identifier corresponding to the dynamic group information. Further, the at least one second V2X UE 100b is configured to store the link layer identifier corresponding to the dynamic group information. Further, the at least one second V2X UE 100b is configured to broadcast the link layer identifier corresponding to the dynamic group information to at least one third V2X UE from the plurality of V2X UEs 100a-100n in the V2X system 1000. Further, the at least one second V2X UE 100b is configured to establish dynamic group communication with at least one of the first V2X UE and the at least one third V2X UE based on the dynamic group information.

Figure 3:
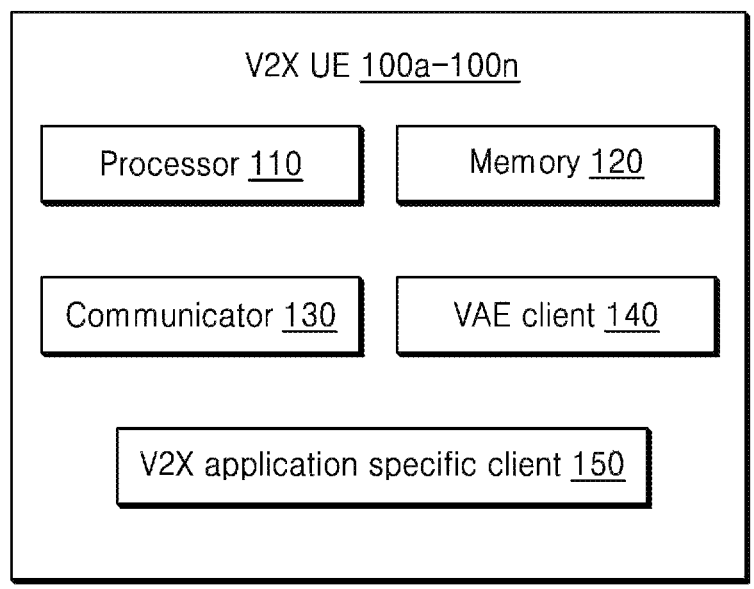
FIG. 3 is a block diagram of a V2X user equipment (UE) for handling dynamic group creation, according to an embodiment of the disclosure.

FIG. 3 is a block diagram of the V2X UEs for handling dynamic group creation, according to an embodiment of the disclosure.

Referring to FIG. 3, the V2X UE 100a includes a processor 110, a memory 120, a communicator 130, and a VAE client 140. The processor 110 is coupled with the memory 120, the communicator 130, and the VAE client 140. The processor 110 is configured to receive the push request including the link layer identifier corresponding to dynamic group information from the first server 200a. The processor 110 is configured to store the link layer identifier corresponding to the dynamic group information. The processor 110 is configured to broadcast the link layer identifier corresponding to the dynamic group information to at least one second V2X UE from a plurality of V2X UEs 100a-100n in the V2X system 1000. The processor 110 is configured to establish dynamic group communication with the at least one second V2X UE in the V2X system 1000a over the first communication interface.

In an embodiment, the processor 110 is configured to determine whether the at least one second V2X UE is in out of service area in the V2X system 1000b. Based on the determination, the processor 110 is configured to continue the dynamic group communication with the first V2X UE 100a by switching to the second communication interface from the first communication interface.

In an embodiment, the processor 110 is configured to configure dynamic group corresponding to dynamic group information. Further, the processor 110 is configured to generate a link layer identifier from at least one of a link layer identifier pool corresponding to the dynamic group information or a link layer identifier rule. Further, the processor 110 is configured to send the push request including the link layer identifier corresponding to the dynamic group information to at least one second V2X UE from a plurality of V2X UEs 100b-100n).

In an embodiment, the processor 110 is configured to receive a link layer identifier corresponding to dynamic group information. Further, the processor 110 is configured to store the link layer identifier corresponding to the dynamic group information. Further, the processor 110 is configured to broadcast the link layer identifier corresponding to the dynamic group information to at least one second V2X UE from a plurality of V2X UEs 100a-100n in the V2X system. Further, the processor 110 is configured to establish the dynamic group communication with the at least one second V2X UE based on the dynamic group information.

The V2X application specific client 150 provides the client side functionalities corresponding to the V2X applications (e.g. platooning client). The V2X application specific client 150 utilizes the VAE client 140 for the V2X application layer support functions. In an embodiment, the V2X application specific client 150 is responsible for V2X dynamic group information. In an embodiment, the V2X application specific client 150 requests the VAE client 140 to configure dynamic group corresponding to the dynamic group information.

In an embodiment, the VAE client 140 generates ProSe Layer-2 Group ID independently based on the provisioned ProSe Layer-2 Group ID(s) generation rules for its group information or the VAE client 140 assigns ProSe Layer-2 Group ID from the pool of configured ProSe Layer-2 Group IDs. Further, the VAE client 140 may further announce the dynamic group information including the corresponding ProSe Layer-2 Group ID to the other VAE clients within the PC5 communication proximity on a PC5 channel dedicated for V5-AE communications, enabling more V2X UEs to join the dynamic group. The VAE client 140 stores the PC5 communication parameters corresponding to the dynamic group information received from another VAE client.

In another embodiment, the VAE client 140 stores the received PC5 communication parameters corresponding to the dynamic group information received from the VAE server 200a. The VAE client 140 may further announce the dynamic group information including the corresponding ProSe Layer-2 Group ID to the other VAE clients within the PC5 communication proximity on the PC5 channel dedicated for V5-AE communications, enabling more V2X UEs to join the dynamic group.

The communicator 130 is configured for communicating internally between internal hardware components and with external devices via one or more networks. The VAE client 140 can be, for example, but not limited to a V2X application, a platoons application or the like. The memory 120 stores instructions to be executed by the processor 110. The memory 120 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 can be configured to store larger amounts of information than the memory. In certain examples, a non-transitory storage medium may store data that can, over time, change (e.g., in random access memory (RAM) or cache).

Although the FIG. 3 shows various hardware components of the V2X UEs 100a-100n but it is to be understood that other embodiments are not limited thereon. In other embodiments, the V2X UEs 100a-100n may include less or more number of components. Further, the labels or names of the components are used only for illustrative purpose and does not limit the scope of the disclosure. One or more components can be combined together to perform same or substantially similar function to handle the dynamic group creation.

Figure 4:
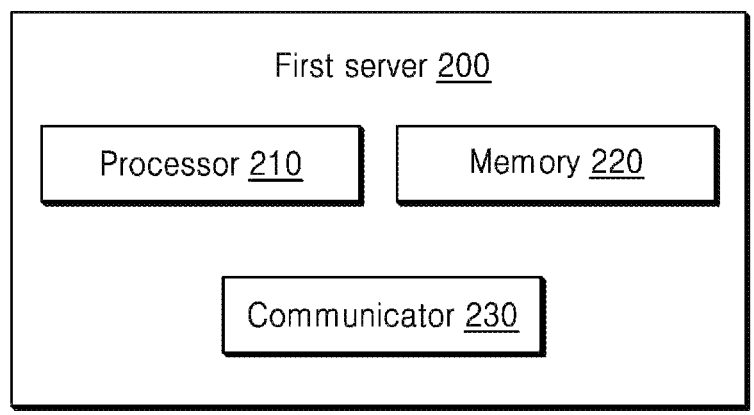
FIG. 4 is a block diagram of a server for handling dynamic group creation, according to an embodiment of the disclosure.

FIG. 4 is a block diagram of the server for handling dynamic group creation, according to an embodiment of the disclosure.

Referring to FIG. 4, the server 200a includes a processor 210, a memory 220, and a communicator 230. The processor 210 is configured to receive a dynamic group configuration request corresponding to dynamic group information from another server 200b. Furthermore, the server 200a may be a base station (Node B), according to an embodiment of the disclosure.

The processor 210 is configured to assign a link layer identifier corresponding to the dynamic group information. The processor 210 is configured to send the push request including the link layer identifier corresponding to the dynamic group information to a first V2X UE 100a from the plurality of V2X UEs 100a-100n.

The communicator 230 is configured for communicating internally between internal hardware components and with external devices via one or more networks. The memory 220 stores instructions to be executed by the processor 210. The memory 220 may include non-volatile storage elements. Examples of such non-volatile storage elements may include magnetic hard discs, optical discs, floppy discs, flash memories, or forms of EPROM or EEPROM memories. In addition, the memory 220 may, in some examples, be considered a non-transitory storage medium. The term "non-transitory" may indicate that the storage medium is not embodied in a carrier wave or a propagated signal. However, the term "non-transitory" should not be interpreted that the memory 220 is non-movable. In some examples, the memory 220 can be configured to store larger amounts of information than the memory. In certain examples, a non-transitory storage medium may store data that can, over time, change (e.g., in RAM or cache).

Although the FIG. 4 shows various hardware components of the server 200a but it is to be understood that other embodiments are not limited thereon. In other embodiments, the server 200a may include less or more number of components. Further, the labels or names of the components are used only for illustrative purpose and does not limit the scope of the disclosure. One or more components can be combined together to perform same or substantially similar function to handle the dynamic group creation.

Figure 5:
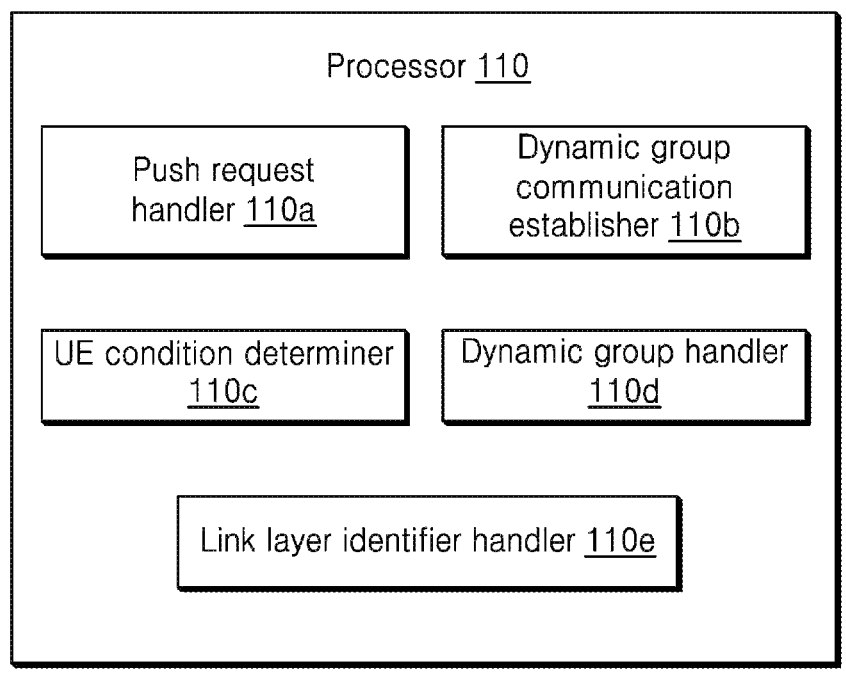
FIG. 5 is a block diagram of various elements in the V2X UE for handling dynamic group creation, according to an embodiment of the disclosure.

FIG. 5 is a block diagram of various elements in the processor 110 of the V2X UEs 100a-100n for handling dynamic group creation, according to an embodiment of the disclosure.

Referring to FIG. 5, the processor 110 includes a push request handler 110a, a dynamic group communication establisher 110b, a V2X UE condition determiner 110c, a dynamic group handler 110d, and a link layer identifier handler 110e.

The push request handler 110a is configured to receive the push request including the link layer identifier corresponding to dynamic group information from the first server 200a. Further, the push request handler 110a is configured to store the link layer identifier corresponding to the dynamic group information. The dynamic group communication establisher 110b is configured to broadcast the link layer identifier corresponding to the dynamic group information to the at least one second V2X UE from the plurality of V2X UEs 100a-100n in the V2X system 1000. The dynamic group communication establisher 110b is configured to establish dynamic group communication with the at least one second V2X UE in the V2X system 1000a over the first communication interface.

In an embodiment, the V2X UE condition determiner 110c is configured to determine whether the at least one second V2X UE is in out of service area in the V2X system 1000b. Based on the determination, the dynamic group handler 110d is configured to continue the dynamic group communication with the first V2X UE 100a by switching to the second communication interface from the first communication interface.

In an embodiment, the dynamic group handler 110d is configured to configure dynamic group corresponding to dynamic group information. Further, the link layer identifier handler 110e is configured to generate the link layer identifier from at least one of a link layer identifier pool corresponding to the dynamic group information or a link layer identifier rule. Further, the push request handler 110a is configured to send the push request including the link layer identifier corresponding to the dynamic group information to at least one second V2X UE from a plurality of V2X UEs 100b-100n.

In an embodiment, the push request handler 110a is configured to receive the link layer identifier corresponding to dynamic group information. Further, the dynamic group communication establisher 110b is configured to establish the dynamic group communication with the at least one second V2X UE based on the dynamic group information.

Although the FIG. 5 shows various hardware components of the processor 110 but it is to be understood that other embodiments are not limited thereon. In other embodiments, the processor 110 may include less or more number of components. Further, the labels or names of the components are used only for illustrative purpose and does not limit the scope of the disclosure. One or more components can be combined together to perform same or substantially similar function to handle the dynamic group creation.

Figure 6:
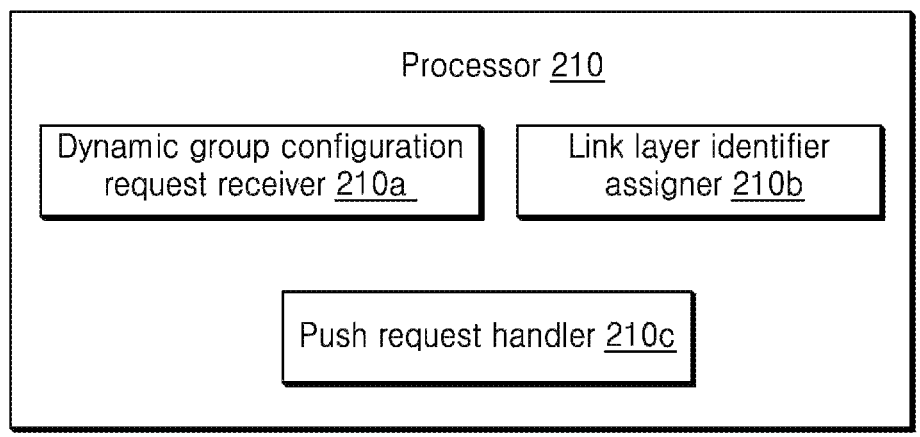
FIG. 6 is a block diagram of various elements in the server for handling dynamic group creation, according to an embodiment of the disclosure.

FIG. 6 is a block diagram of various elements in the processor 210 of a server for handling dynamic group creation, according to an embodiment of the disclosure.

Referring to FIG. 6, the processor 210 includes a dynamic group configuration request receiver 210a, a link layer identifier assigner 210b, and a push request handler 210c. The dynamic group configuration request receiver 210a is configured to receive the dynamic group configuration request corresponding to dynamic group information from another server 200b. The link layer identifier assigner 210b is configured to assign the link layer identifier corresponding to the dynamic group information. The push request handler 210c is configured to send the push request including the link layer identifier corresponding to the dynamic group information to a first V2X UE 100a from the plurality of V2X UEs 100a-100n.

Although the FIG. 6 shows various hardware components of the processor 210 but it is to be understood that other embodiments are not limited thereon. In other embodiments, the processor 210 may include less or more number of components. Further, the labels or names of the components are used only for illustrative purpose and does not limit the scope of the disclosure. One or more components can be combined together to perform same or substantially similar function to handle the dynamic group creation.

Figure 7:
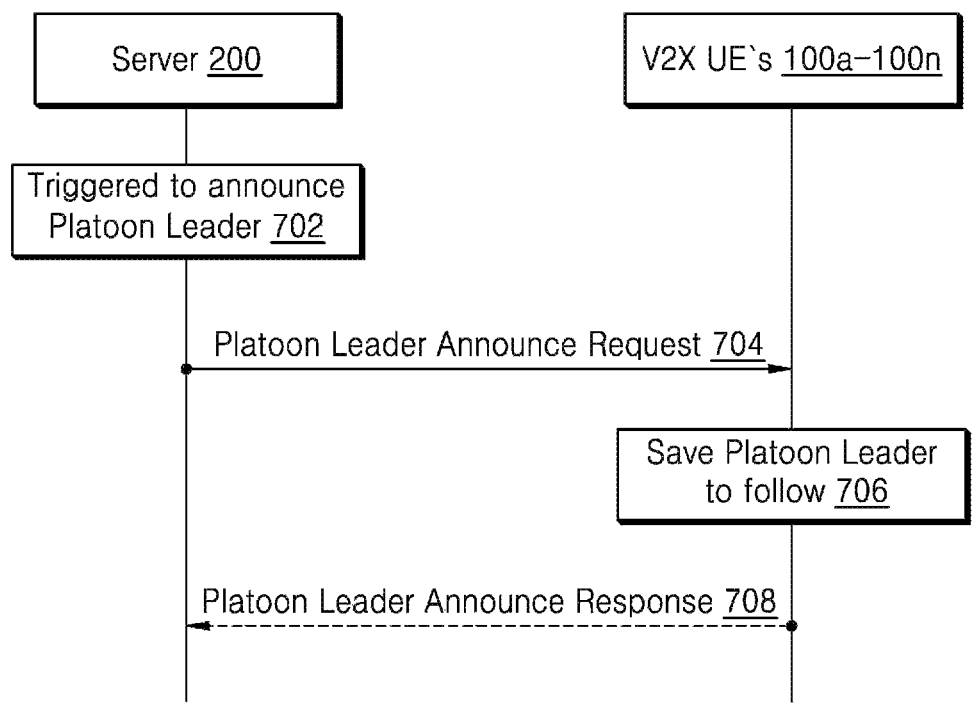
FIG. 7 is a sequential diagram illustrating various operations in a platoon leader announcement in an on-network, according to an embodiment of the disclosure.

FIG. 7 is a sequential diagram illustrating various operations in a platoon leader announcement in on-network, according to an embodiment of the disclosure.

Referring to FIG. 7, in broadcast type of V2X communication it may not be necessary to form a group since all the entities receiving broadcasted message could consume it. However prior to V2X communication meant to a group, it is necessary to form the group with right set of V2X UEs. If the members of the V2X UE are already known while the group is being created, such organized groups can be created on an application server and used for on-network group communications. Same organized groups could be configured on the V2X UEs for off-network group communication as well.

In an organized platoon, the groups can be created any time prior to V2X communication and a platoon leader can be assigned. But dynamic platoons are created on-demand basis for immediate V2X communication and the platoon leader is determined in run time. The dynamic platoons are short lived i.e., a dynamic group exists until at least one user is using the group for V2X communication. The dynamic platoons can be formed with the aid of network (e.g. road side unit (RSU), application server or the like) called on-network mode or in off-network mode without the assistance of the network.

The V2X UE includes an application client (client side functionalities corresponding to the V2X applications) and the enabler client (provides the client side V2X application layer support functions) functionality.

On-network Dynamic Platoons: In on-network dynamic platoons, the V2X user should join a platoon in order to communicate with the platoon members. The platoon member can leave the platoon at any time and will not able to communicate further within the platoon. The platoon is dissolved when there are no platoon members left in the platoon to communicate. Two or more platoons can be merged as necessary, which might result in a new Platoon leader announcement. Similarly a platoon can be split into two or more and results in determining Platoon leader for each split platoon.

1.1) server 200: The dynamic platoons is created and maintained by the server 200, which are later on used for the on-network and off-network V2X communications. Examples of such server 200 include V2X application server, RSU etc. In case of V2X application server acting as a server 200, each of the V2X UEs of the platoon could belong to different PLMNs. In case of RSU acting as the server 200, V2X UEs of a platoon could belong to different PLMNs provided those PLMNs have service agreement. The application server may be further comprised with the application specific server (i.e., server side functionalities corresponding to the V2X applications) and application enabler server (i.e., server side V2X application layer support functions) functionality.

1.2) Platoon information: The platoon information is created and maintained by the server 200a for each dynamic platoon. The information includes at least the Platoon ID, Platoon members IDs, Platoon Leader, Platoon Source Location, Platoon Destination Location, Platoon Direction, Platoon Path Nodes, Platoon Creation Time, Vehicle Type (may include Level of automation), Maximum members allowed, ProSe Layer-2 Platoon ID etc.

1.3) Determine Platoon Leader: The platoon leader provides Platoon Management information such as Platoon Speed, Platoon Lane Position, Inter-vehicle Distance, etc. to the Following Vehicles. Platoon Leader may collate the commute information feedback from the Following Vehicles for determining such management information and then to provide to the Following Vehicles. Determining Platoon Leader is up to the application logic. At any point of time there will be only one Platoon Leader for each Platoon. Platoon Leader could be a vehicle which is at the front of the Platoon, a vehicle triggering a new platoon creation, a vehicle at the center of the Platoon, RSU, V2X Application Server, etc.

1.4) Announce Platoon Leader: Subsequent to determination of Platoon Leader, the Platoon members need to be aware of the Platoon Leader so that the Following Vehicles react and adapt commute parameters (e.g., Speed, Lane Position, Inter-vehicle Distance etc.) of their respective vehicles in order to remain part of the Platoon. So anytime the Platoon Leader is changed or new members join the Platoon, Platoon Leader is announced to the entire Platoon or particular members of the Platoon. The operations in the FIG. 1 describes how the server 200 in on-network initiates Platoon Leader announcement with other Platoon members.

Pre-conditions: Platoon has been created with members.

Referring to FIG. 7, the server 200 where the platoon resides is triggered (e.g. due to determination of new platoon leader) at operation 702 to update the platoon members. The server 200 sends platoon leader announce request to the platoon members (all or particular members as applicable), which includes the platoon leader to be followed during the platoon communication at operation 704. At operation 706, the platoon member receiving the announcement stores the received platoon leader information. At operation 708, the platoon members receiving the announcement sends the platoon leader announce response to the server 200 to confirm that the platoon leader announcement is complete.

Figure 8:
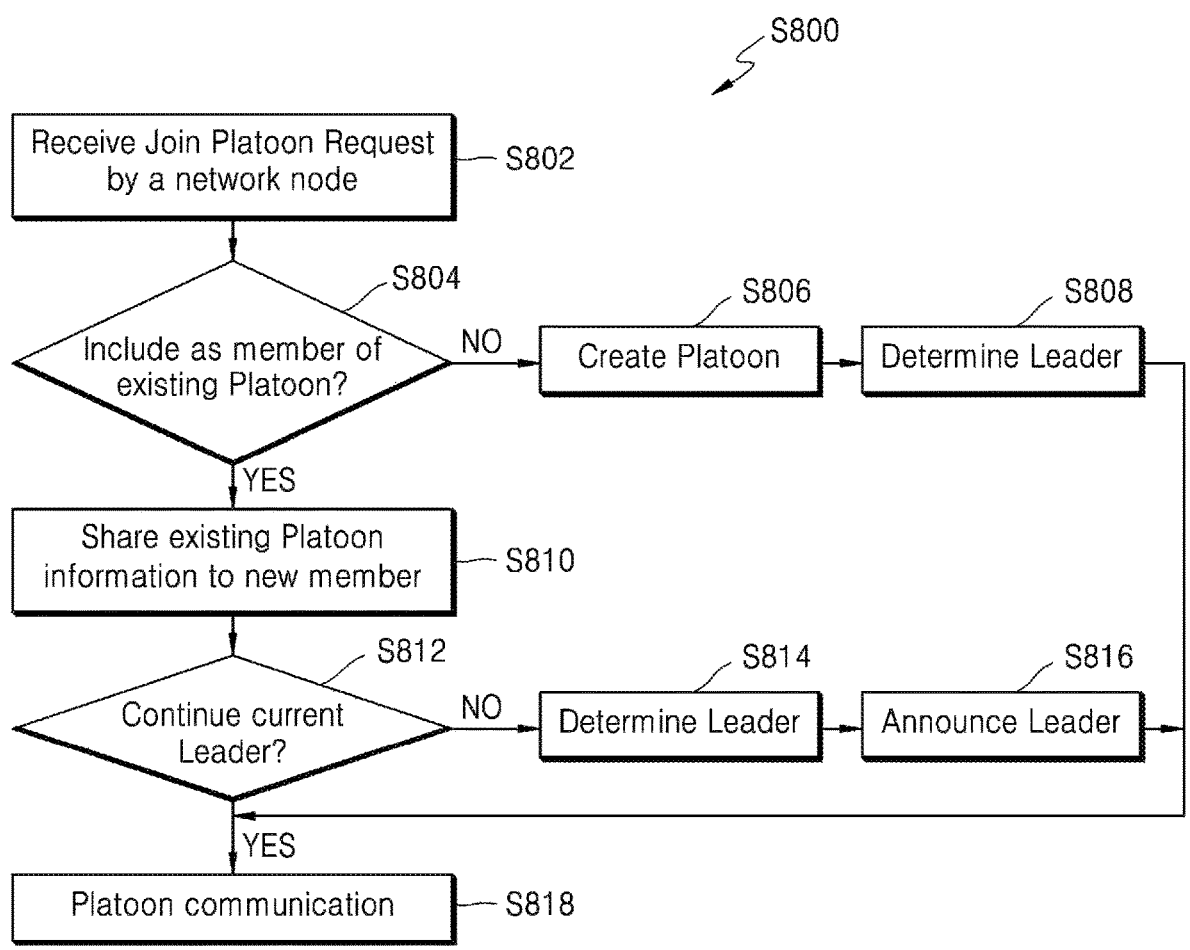
FIG. 8 is a flow diagram illustrating operations for joining a platoon in the on-network, according to an embodiment of the disclosure.

FIG. 8 is a flow diagram S800 illustrating operations for joining the platoon in an on-network system, according to an embodiment of the disclosure.

Pre-conditions: The user of the V2X UE 100a has turned on the platoon application on the vehicle and is interested to platoon for travelling to a particular destination. The vehicle information i.e. vehicle type, vehicle location etc. is accessible to the platoon application. The user has indicated destination information to the platoon application. The server 200 is configured/available at the V2X UE 100a.

At operation S802, the server 200 has received the platoon join request from the platoon application on the V2X UE including the vehicle information and the user indicated destination information. At operation S804, the server 200 considers the vehicle and user provided information to determine whether pertinent platoon already exists. If the platoon does not exist then, at operation S806, the server 200 may decide to create new the platoon. Even if such platoon exists the server 200 may decide to create a new platoon depending on the time of request and other factors such as maximum members limit has reached for the platoon. Otherwise, the server 200 may decide to add requesting the user to an existing platoon. Upon deciding to create a new platoon, the server 200 has to generate the platoon information. At operation S808, the platoon information requires a platoon leader to be determined. The platoon information is then shared to the platoon join requesting user. At operation S810, when the server 200 decides to include the platoon join requesting user to an existing Platoon, the platoon information is shared to the platoon join requesting user. At operation S812, upon new user joining the existing Platoon, the server 200 determines whether a new platoon leader is required. At operation S814, if the new platoon leader has to be selected, the procedure described in section 1.3 is followed. At operation S816, the new platoon Leader is announced following the procedures described in section 1.4. In this case the announcement is made to all members of the platoon. At operation S818, platoon formation is completed and the members engage in the V2X communication.

Figure 9:
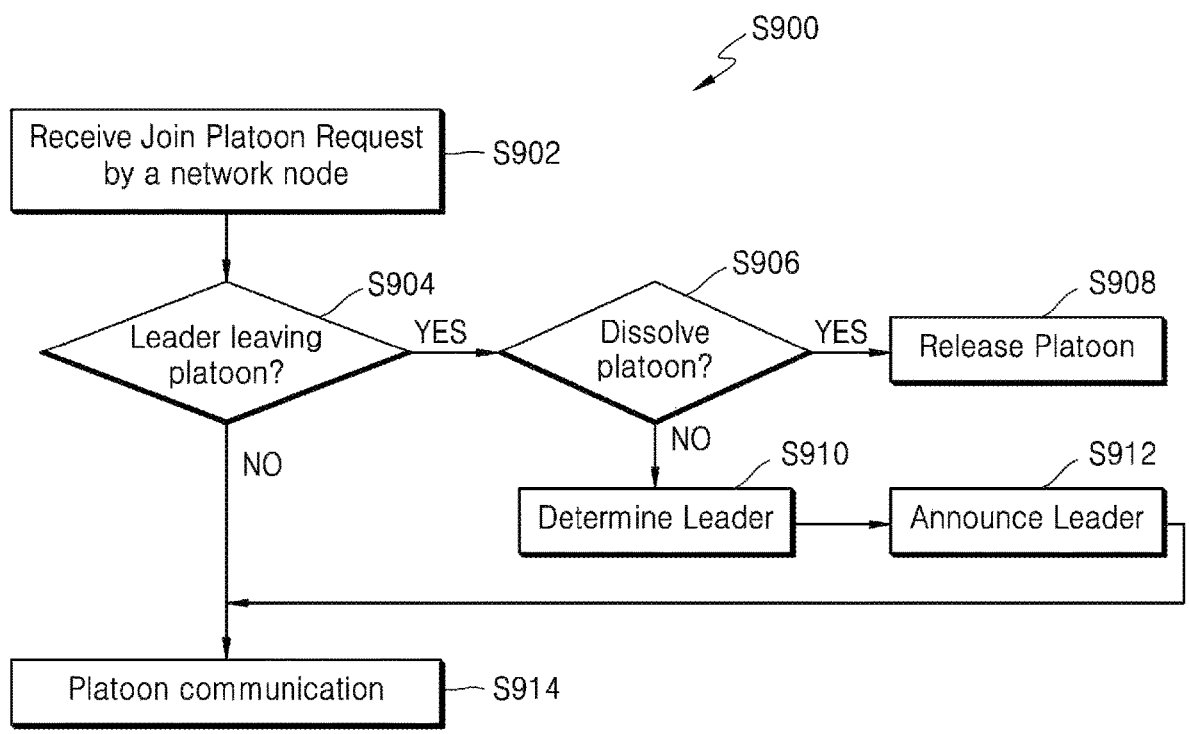
FIG. 9 is a flow diagram illustrating operations for leaving the platoon in the on-network, according to an embodiment of the disclosure.

FIG. 9 is a flow diagram S900 illustrating operations for leaving the platoon in on-network, according to an embodiment of the disclosure herein.

Pre-conditions: The user of the V2X UE is already a member of the platoon. At operation S902, the server 200 has received the leave platoon request from the platoon application on V2X UE 100a including the platoon ID for which the user is leaving. At operation S904, the server 200 checks if the user leaving platoon is platoon leader to decide whether to continue the platoon or not. At operation S906, the server 200 checks if the platoon is dissolved or to be continued based on the policy e.g. dissolve platoon on leader leaving the platoon, last member leaving the platoon. At S operation 908, if the server 200 has decided to dissolve the platoon, then the server 200 releases the resources and may remove the relevant platoon information from the server 200. At S910, if the platoon leader is leaving the platoon, the server 200 determines the new platoon leader as described in section 1.3. At operation S912, the new platoon leader is announced following the procedures described in section 1.4. In this case the announcement is made to all members of the platoon. Existing platoon members continue to engage in the V2X communication at operation S914.

Figure 10:
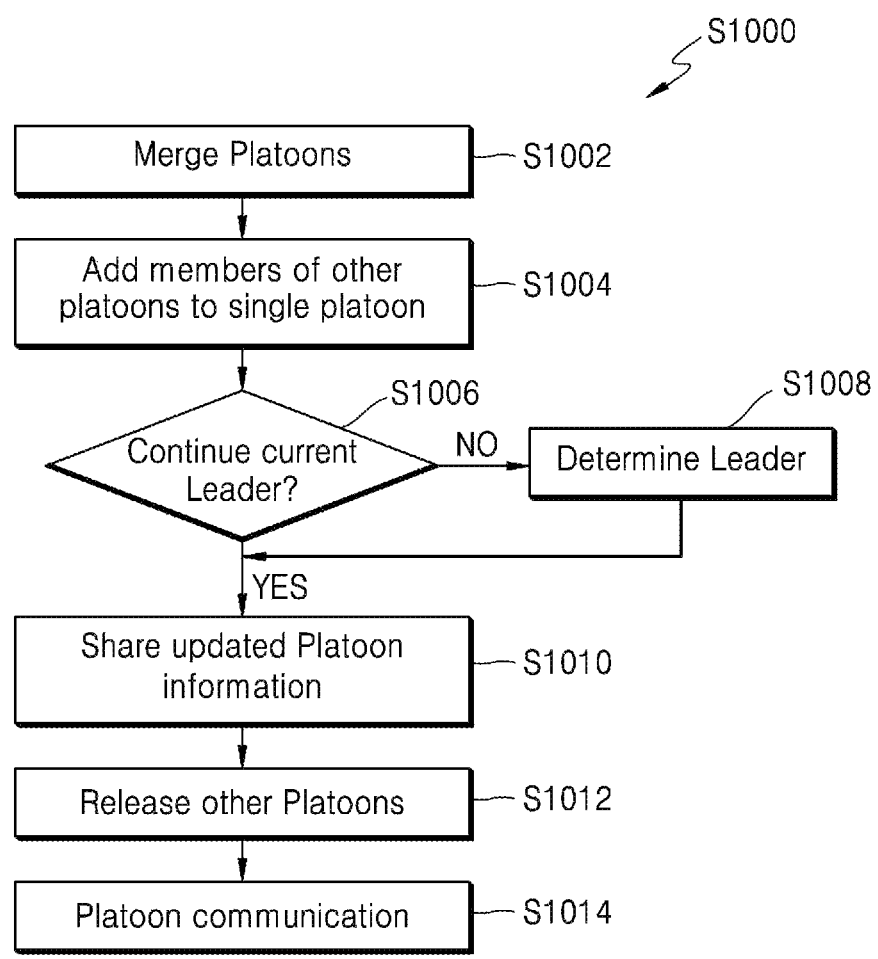
FIG. 10 is a flow diagram illustrating operations for merging two or more platoons in the on-network, according to an embodiment of the disclosure.

FIG. 10 is a flow diagram S1000 illustrating operations for merging two or more platoons in the on-network, according to an embodiment of the disclosure.

Pre-conditions: Two or more Platoons being merged are already existing.

At operation S1002, the server 200 decides to merge two or more platoons based on policy e.g. platoons having destinations on the same path, still within maximum members limit by merging platoon members from platoons being merged. At operation S1004, the server 200 decides to extend from one of the existing platoons being merged with the members of the other platoons, so as to ensure that the total platoon members is still within maximum members limit. At operation S1006, upon merging platoons, the server 200 determines whether a new platoon leader is required. At operation S1008, if a new platoon leader has to be selected, the procedure described in section 1.3 is followed. At operation S1010, updated platoon information (as described in section 1.2) is shared to all members of the platoon. At operation S1012, the server 200 dissolves other platoons and releases the resources removing the relevant platoon information. At operation S1014, the platoon members engage in V2X communication.

Figure 11:
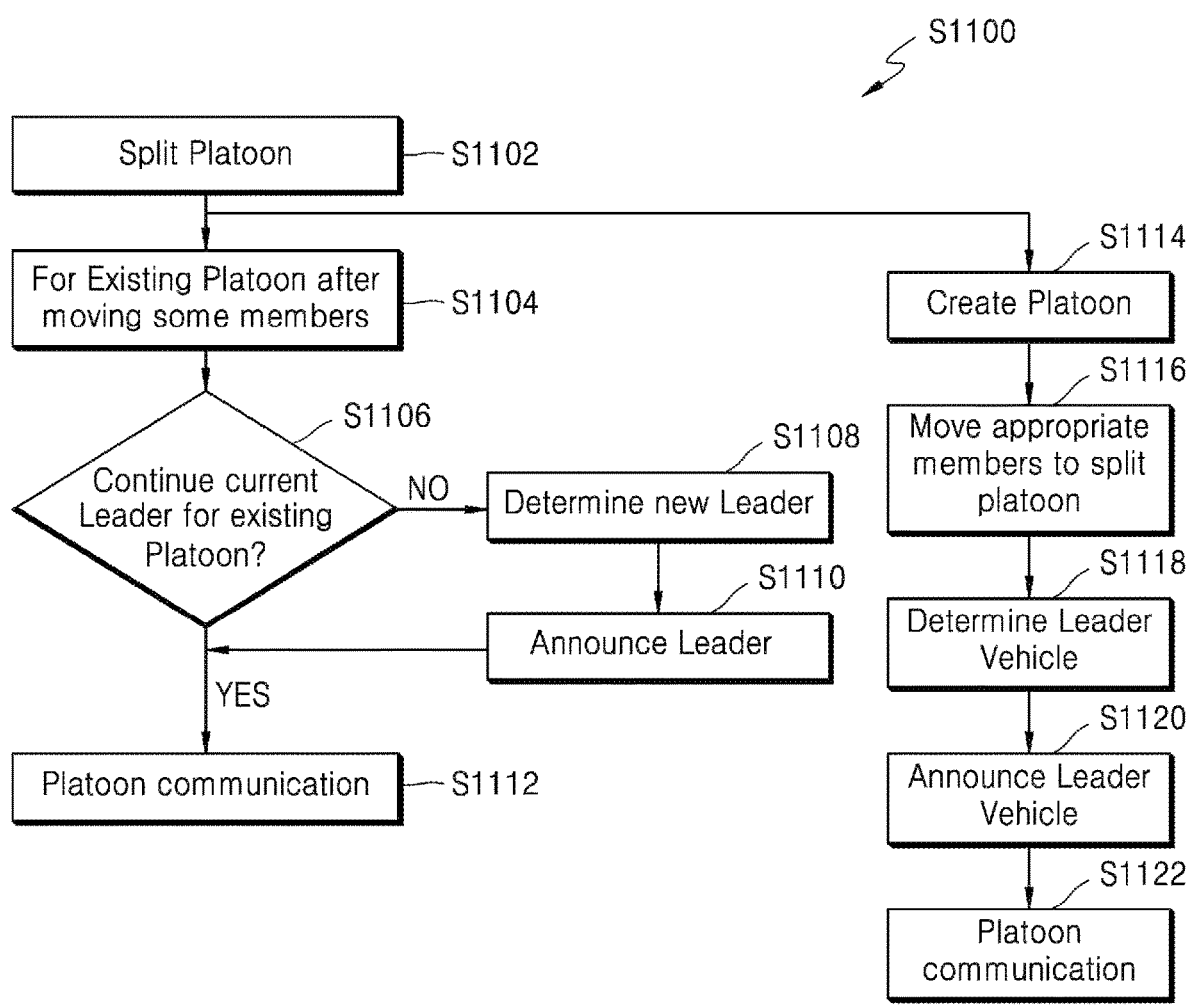
FIG. 11 is a flow diagram illustrating operations for splitting the platoon into more than one platoon in the on-network, according to an embodiment of the disclosure.

FIG. 11 is a flow diagram S1100 illustrating operations for splitting the platoon into more than one platoon in an on-network, according to an embodiment of the disclosure.

Pre-conditions: An existing platoon is the one that has to be split.

At operation S1102, the server 200 decides to split the platoon e.g. due to subset of platoon members having destination that requires a different path. At operation S1104, the server 200 decides to move subset of the platoon members to a newly created platoon and remaining members continue to use the reformed platoon with updated platoon information (described in section 1.2). At operation S1106, when the subset of the platoon members are moved to a new platoon, the server 200 has to decide if there is a platoon leader who can continue the reformed platoon. At operation S1108, if a new platoon leader has to be selected, the procedure described in section 1.3 is followed. At operation S1110, updated platoon information (as described in section 1.2) is shared to all members of the reformed platoon. At operation S1112, existing platoon members continue to engage in V2X communication. At operation S1114, a new platoon is created for the newer destination. At operation S1116, subset of the platoon members from the original platoon are moved to the new platoon. At operation S1118, upon creating a new platoon, the server 200 determines platoon leader following the procedure described in section 1.3. At operation S1120, new platoon leader is announced following the procedures described in section 1.4. In this case the announcement is made to all members of the newly created platoon. At operation S1122, platoon formation is completed and the members engage in V2X communication.

Figure 12:
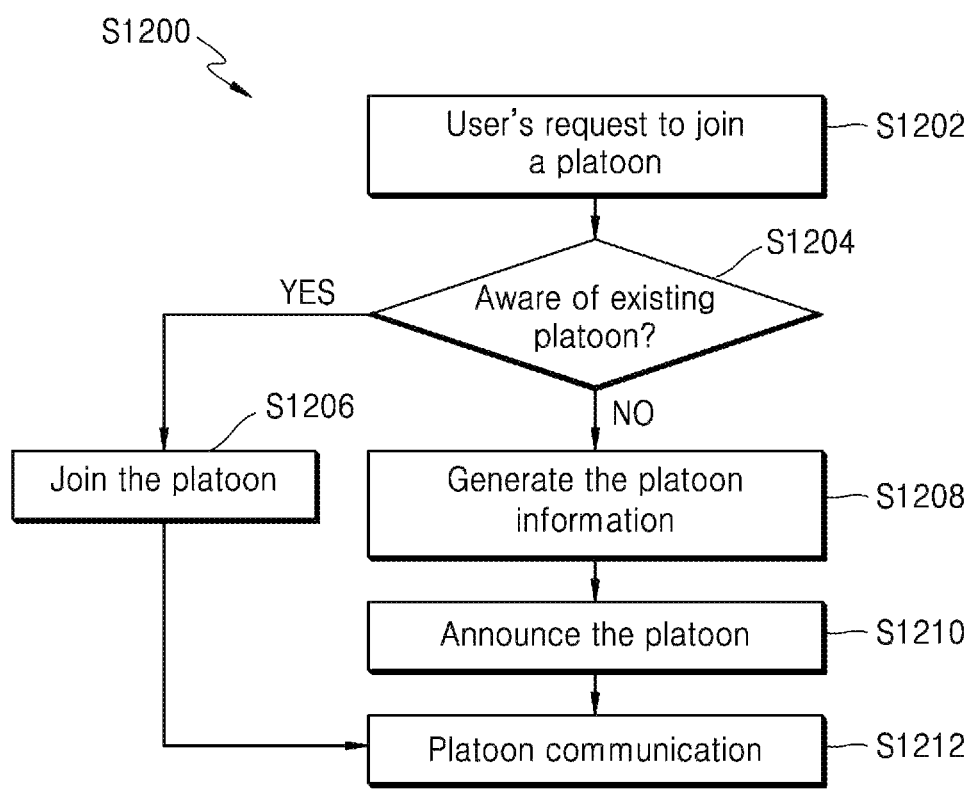
FIG. 12 is a flow diagram illustrating operations for joining or creating the platoon in the off-network, according to an embodiment of the disclosure.

FIG. 12 is a flow diagram S1200 illustrating operations for joining or creating the platoon in the off-network, according to an embodiment of the disclosure.

Off-network Dynamic Platoons: Dynamic Platoons in off-network are created and maintained by individual platoon members. In off-network dynamic platoons, the V2X user should create a new platoon or join an existing platoon if aware of an existing platoon, in order to communicate with other platoon members. The platoon member moving out of communication range of other platoon members is considered to have left the platoon. The platoon may be released by the platoon member when no communication is received from any other platoon member for a configured amount of time. The platoon members can switch platoon if they are in communication range of multiple platoons.

2.1 Platoon information: In off-network, the platoon information is generated by the platoon leader (or the creator of the platoon) and updated, maintained and propagated to the subsequent platoon members. The information includes at least the platoon ID, platoon members IDs, platoon Leader, platoon source location, platoon destination location, platoon direction, platoon creation time, vehicle type (may include level of automation), maximum members allowed, ProSe Layer-2 Platoon ID etc.

2.2 Determine Platoon Leader: The platoon leader provides platoon management information such as platoon speed, platoon lane position, inter-vehicle distance, etc. to the following vehicles. The platoon leader may collate the inputs from the following vehicles for determining such management information and then to provide to the following vehicles. Determining platoon leader is up to the application logic. At any point of time there will be only one platoon leader for each platoon. In off-network, the platoon leader could be a vehicle which is at the front of the platoon, a vehicle triggering a new platoon creation, a vehicle at the center of the platoon, etc. in off-network, due to coverage limitations, the platoon is highly dynamic in nature, but a new platoon leader is determined only in 2 scenarios. When the platoon is merged with another platoon (which may have only 1 member) resulting in possibly two platoon leaders. When the leader of the current platoon leaves the platoon resulting in no platoon leader.

2.3 Subsequent Platoon Leaders: Subsequent to determination of the new platoon leader, the platoon members need to be updated about the change in platoon leader so that the following vehicles react and adapt parameters (speed, lane position, inter-vehicle distance etc.) of their respective vehicles in order to remain part of the platoon. So anytime the platoon leader is changed, the new platoon leader announces it to the entire platoon.

2.5 Platoon communication and periodic announcement of platoon information: During platoon communication, the V2X UEs, share commute information with each other such as traffic information, lane information, speed information etc. The Platoon leader takes this feedback information into account and generate instructions for the Following vehicles to maintain the platoon. During the platoon communication, the Platoon leader needs to periodically announce the platoon information for non-member V2X UEs to join the platoon and for platoon members to be aware that the Platoon leader is available.

2.6 Dissolve a platoon: During platoon communication, if the V2X UE decides to end the platoon communication and dissolve the platoon, it simply stops sending or receiving or processing any communication related to the platoon. If the leader of the platoon decides to end platoon communication it eventually leads to following vehicles detecting absence of the platoon leader.

Pre-conditions: The user has turned on platoon application on the vehicle and is interested to platoon for travelling to the particular destination. Vehicle information i.e. vehicle type, vehicle location etc. is accessible to the platoon application. The user has indicated destination information to the platoon application.

At operation S1202, the V2X user request the V2X UE 100a to join a platoon. The user's request to join a platoon includes the destination information.

Upon receiving the user's request, the V2X UE 100a determines if the V2X UE is aware of an existing platoon that matches the request of the user at operation S1204. To be aware of the existing platoons, the V2X UE 100a may process the received periodic platoon announcements from existing platoons in the communication range.

If the V2X UE is aware of an existing platoon that fits the criteria such as destination of the platoon, vehicle types etc., the V2X UE joins the platoon at operation S1206.

If the V2X UE 100a is not aware of an existing platoon that fits the criteria then, at operation S1208, the V2X UE 100a generates new platoon information. The new platoon information includes, but not limited to, information such as platoon destination, vehicle type, Prose Layer-2 Platoon ID etc.

At operation S1210, once the platoon information is generated, the V2X UE 100 announces or broadcasts this platoon information to other V2X UEs in the communication range. This broadcast announcement helps other V2X UEs to be aware of existing V2X platoons within the communication range. If a periodic platoon announcement is not received for a configured amount of time, the V2X UE may assume that the platoon is no longer available.

Once announced, the V2X UEs 100 which are part of the platoon, i.e. Platoon leader and the following vehicles share commute information with each other. The platoon leader takes this feedback information in account and provide the Following vehicles with platoon related instructions at operation S1212.

Figure 13:
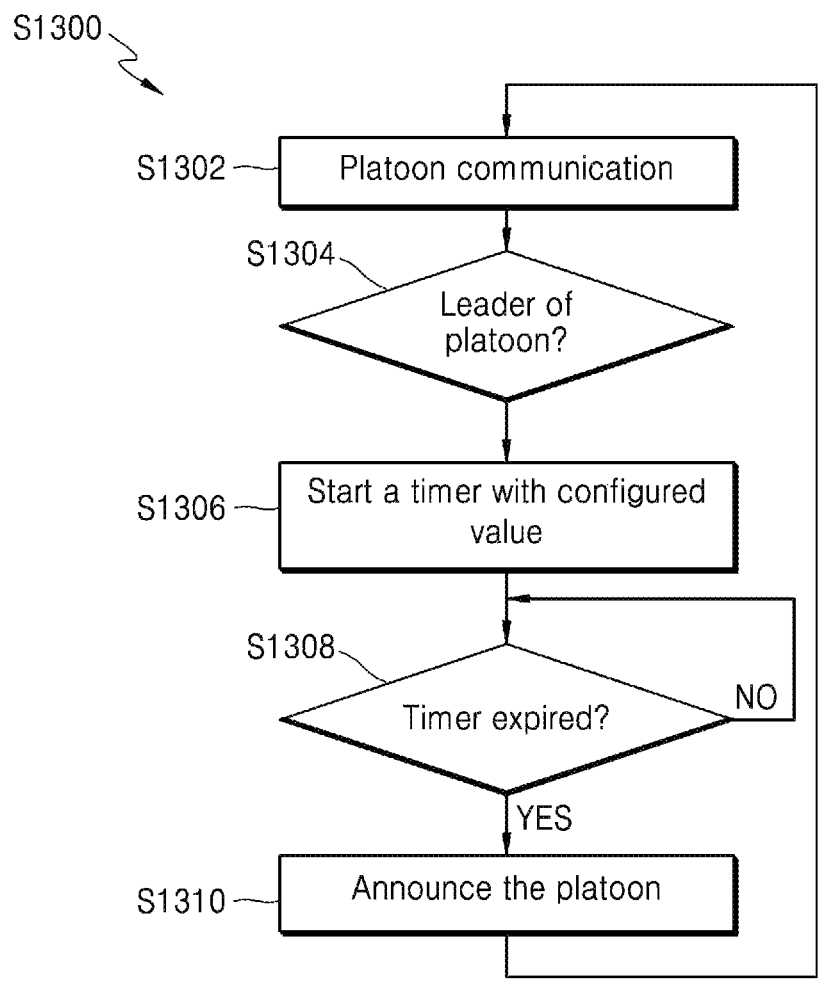
FIG. 13 is a flow diagram illustrating operations for the platoon communication in the off-network, according to an embodiment of the disclosure.

FIG. 13 is a flow diagram S1300 illustrating operations for the platoon communication in the off-network, according to an embodiment of the disclosure.

At operation S1302, the platoon communication is active. At operation S1304, V2X UEs 100 check if they are the platoon leader. At operation S1306, if the V2X UE 100 is the platoon leader it starts a timer with a preconfigured value. At operation S1308, the V2X UE waits for expiry of the timer and continues with the platoon communication and platoon leader responsibilities. At operation S1310, on expiry of the timer, the V2X UE 100 announces the platoon again for other non-member V2X UE to join and for platoon members to be aware that the Platoon leader is available.

Figure 14:
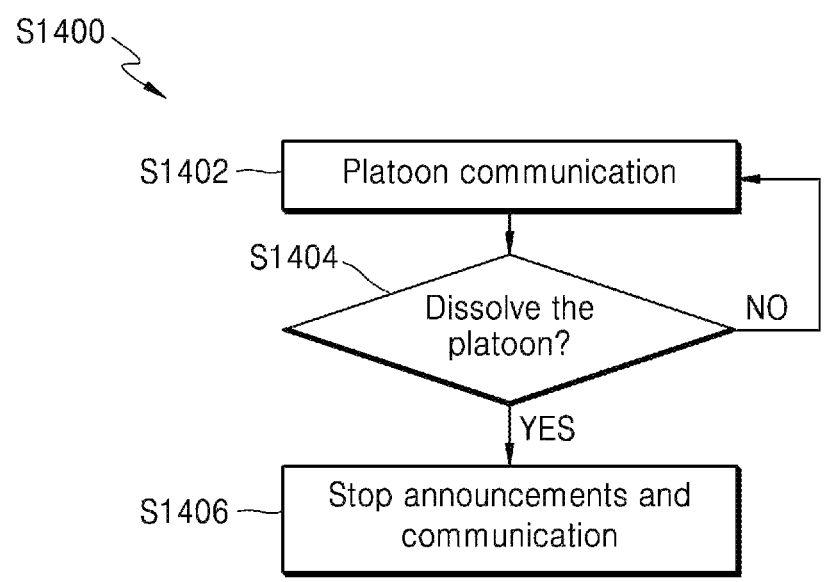
FIG. 14 is a flow diagram illustrating operations for dissolving the platoon in the off-network, according to an embodiment of the disclosure.

FIG. 14 is a flow diagram S1400 illustrating operations for dissolving the platoon in the off-network, according to an embodiment of the disclosure.

At operation S1402, the platoon communication is active. At operation S1404, the V2X UE 100 decides to dissolve the platoon. This decision could be based on multiple factors such as, but not limited to, not receiving any communication from other platoon members, reaching the destination, diversion of the route, such as change in destination, change in vehicle conditions etc. If the V2X UE decides to dissolve the platoon then, at operation S1406, it stops processing any communication related to the platoon. If the V2X UE is the leader it also stops announcing the platoon.

Figure 15:
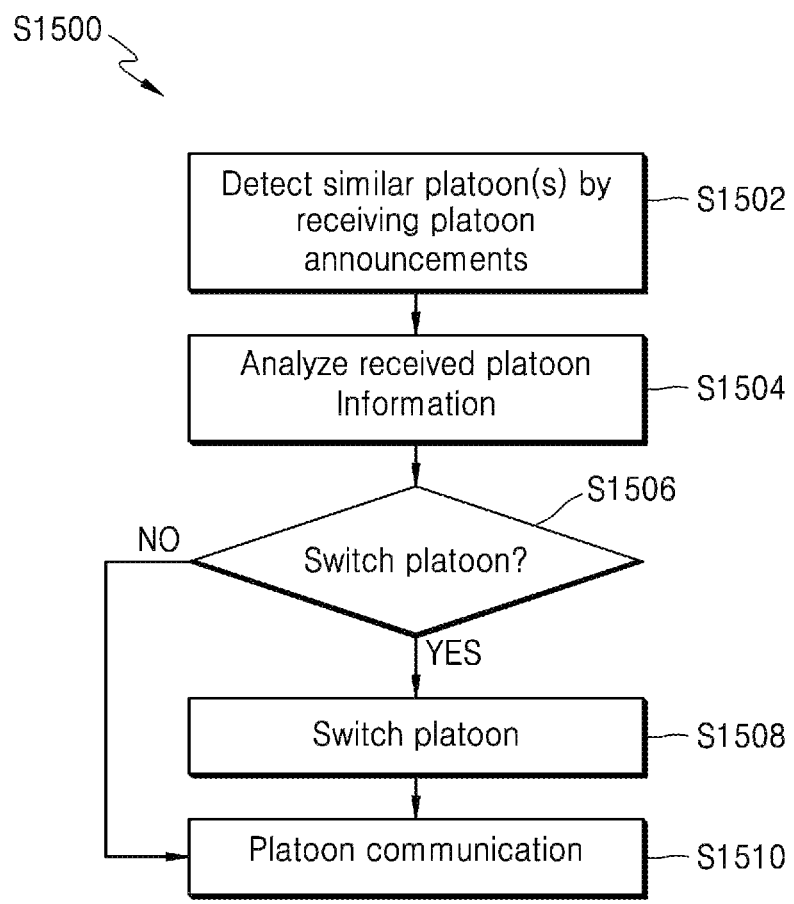
FIG. 15 is a flow diagram illustrating operations for switching between the platoons in the off-network, according to an embodiment of the disclosure.

FIG. 15 is a flow diagram S1500 illustrating operations for switching between the platoons in the off-network, according to an embodiment of the disclosure.

Switch platoons and merging: Due to dynamic nature of off-network communications, the V2X UE may receive platoon information from different platoon leaders while being part of a platoon. Some of these platoon information may be relevant to the V2X UE receiving it. If the V2X UE receives information of a new platoon which is more suitable for the V2X UE, the V2X UE may decide to switch the platoon. If all members of one platoon switch to another platoon, it results in a merged platoon.

Pre-conditions: Members of two or more similar platoons in communication range.

At operation S1502, in off-network communications, the V2X UE 100 may be receiving platoon announcements from several platoon leaders. At operation S1504, the V2X UE processes the received platoon announcements to detect and filter platoons relevant or similar to the platoons V2X UE 100 is part of it. These filtered information about other platoons is further analyzed by the V2X UE 100 to find platoons to which the V2X UE 100 can switch to. At operation S1506, a decision is made by the V2X UE 100 or the V2X user on whether to switch the platoon to a different platoon which is more relevant. If the V2X UE 100 or the V2X user decide to not switch the platoon then, at operation S1508, the platoon communication continues with the current platoon. If the V2X UE 100 or the V2X user decide to switch the platoon then, the V2X UE 100 stops all the communication with the current platoon, and starts communication with the new platoon. At operation S1510, the platoon communication continues with the selected platoon. This platoon communication includes sending periodic platoon announcements if the V2X UE is the leader of the platoon.

Figure 16:
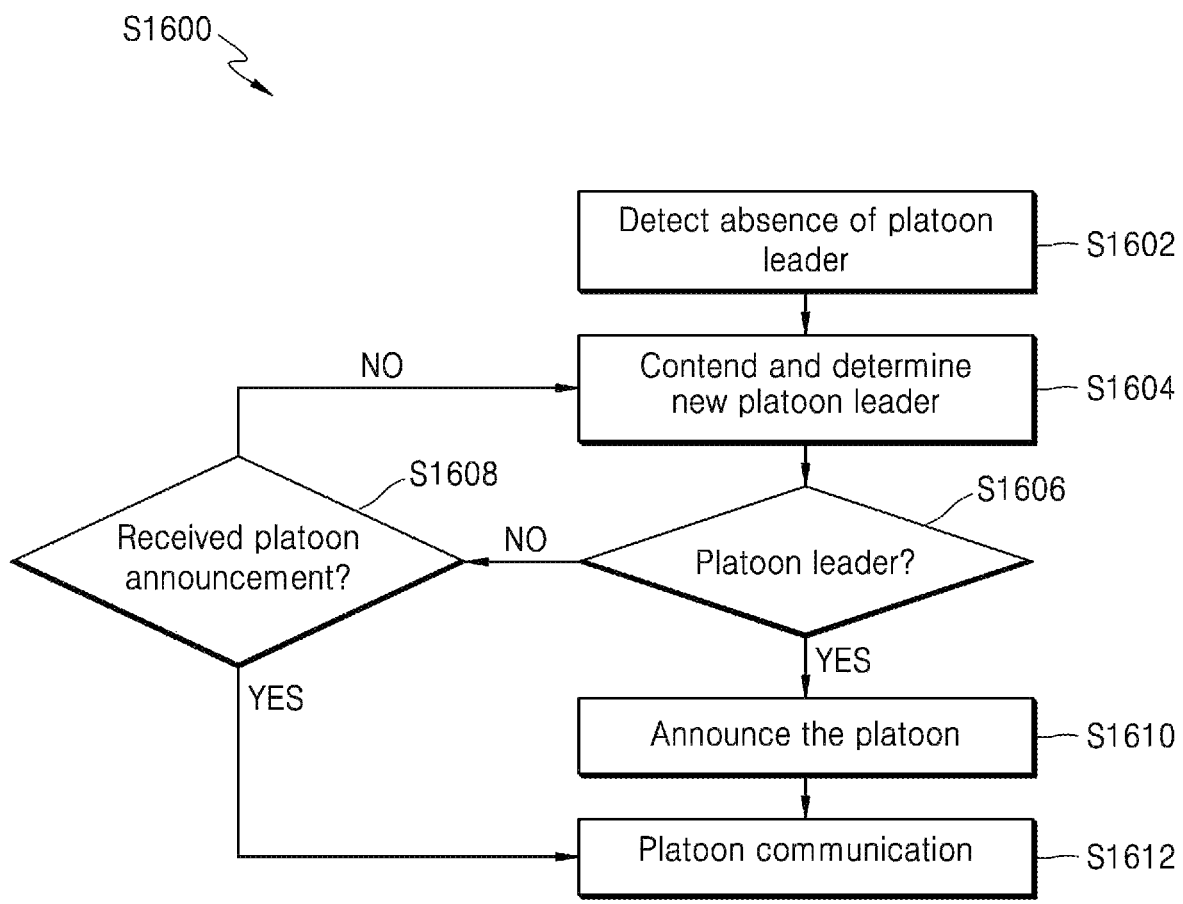
FIG. 16 is a flow diagram illustrating operations for detecting an absence of the platoon leader in the off-network, according to an embodiment of the disclosure.

FIG. 16 is a flow diagram S1600 illustrating operations when the V2X vehicle detects absence of the platoon leader in the off-network, according to an embodiment of the disclosure.

Detecting absence of leader: In off-network the platoon leader may leave the platoon without informing the Following vehicles. This could be due to multiple reasons such as, the platoon leader changing the destination, the platoon leader going out of communication range etc. in such a scenario, the Following vehicles need to monitor the presence of the platoon leader by, for example monitoring the platoon announcements, and when absence of the platoon leader is detected, a new platoon leader should be determined.

At operation S1602, the following vehicles need to monitor the presence of a Platoon leader in off-network. The following vehicles may detect absence of the platoon leader, for e.g. by not receiving platoon announcements for a configured period of time.

At operation S1604, on determining absence of the platoon leader, a new platoon leader should be selected immediately. In order to select a new leader of the platoon, the following vehicles contend by sharing information about their V2X UEs 100 with each other. This information may include elements such as geographic location of the vehicle, position of the vehicle, destination of the vehicle, lane information, speed information, type of the vehicle etc. on receiving information from other V2X UEs, the V2X UE 100 compares its own information with other V2X UEs. Based on the available inputs, the V2X UE 100 determines if the vehicle is the new platoon leader or not. This decision can be based on the input parameters such as position of the vehicle.

If the V2X UE determines that it is not the platoon leader and there is another following member which is better suitable to be the platoon leader at operation S1606.

The V2X UE 100 waits to receive the platoon announcement from the other V2X UE 100. If the V2X UE 100 receives the platoon announcement it continues with the platoon communication as mentioned at operation S1608.

If the V2X UE determines that it is the new platoon leader the, at operation S1610, it starts sending a periodic platoon announcement to other V2X UEs. This platoon announcement includes information such as the destination of the platoon, type of vehicles, inter-vehicle distance, Prose layer-2 platoon ID etc.

At operation S1612, following determination of the new platoon leader the platoon communication continues.

Dynamic Platoons continuity moving from On-network to Off-network. The Platoon information (described in section 1.2) created while the V2X UEs were online is ensured that it is available at the V2X UEs even when the V2X UEs go Off-network. This Platoon information is continued to be used for Off-network V2X communication.

Dynamic Platoons continuity moving from one RSU to another. To assist with the dynamic platoon continuity moving from one RSU to another, the RSU creating a new platoon stores the Platoon information in a central repository. In this case where the new RSU receives the commute information from an unknown V2X Platoon then the RSU retrieves the Platoon information (as described in 1.2) from a central repository and the new RSU performs the role of Platoon leader.

Figure 17:
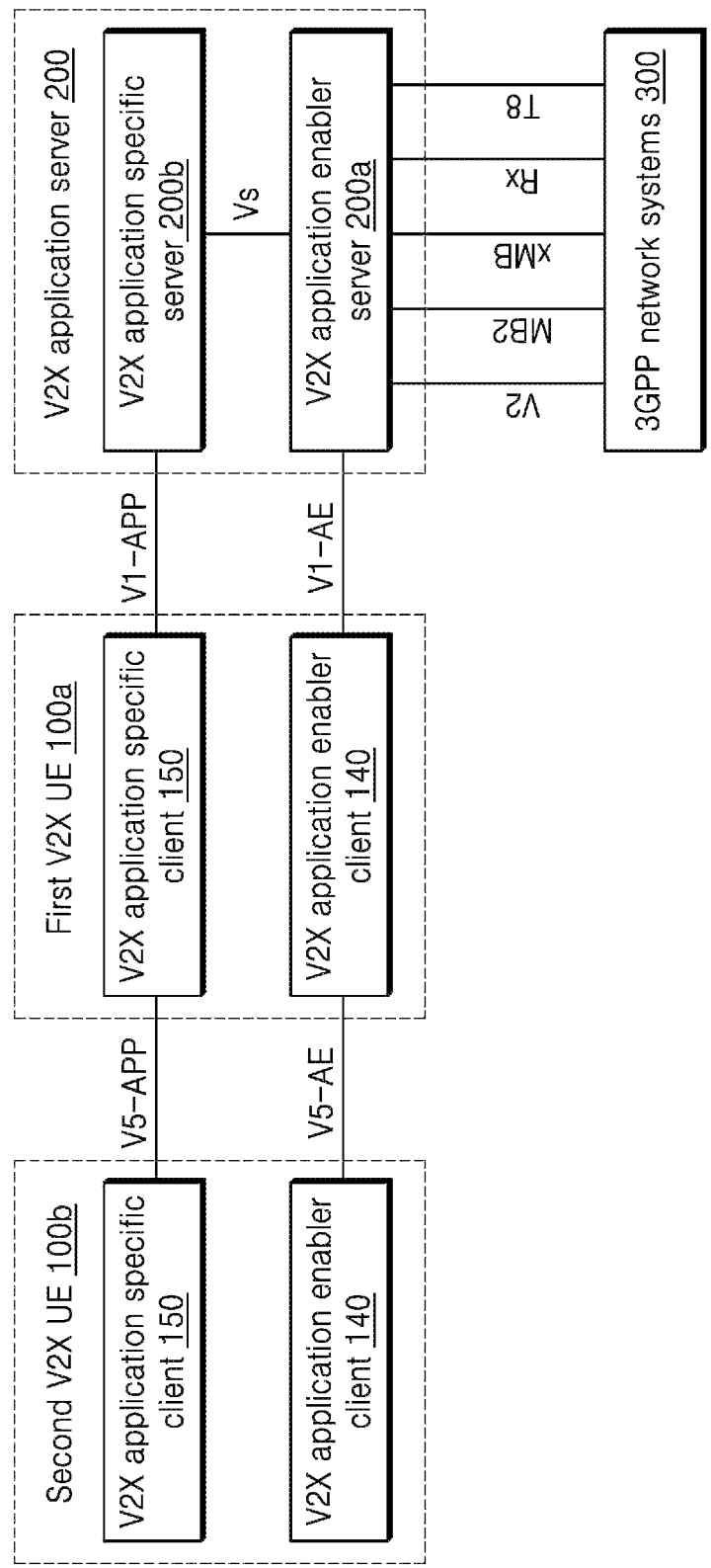
FIG. 17 illustrates a conventional V2X application layer functional model detailed V2X which includes functional entities at the V2X application layer, according to an embodiment of the disclosure.

FIG. 17 illustrates a conventional V2X application layer functional model detailed V2X which includes functional entities at a V2X application layer, according to an embodiment of the disclosure.

Referring to FIG. 17, the V2X application server 200 consists of VAE server 200a and the V2X application specific server 200b. The VAE server 200a provides the V2X application layer support functions to the V2X application specific server 200b over Vs reference point. The V2X UEs 100a-100n consist of the VAE client and the V2X application specific client. The VAE client provides the V2X application layer support functions to the V2X application specific client. The VAE client communicates with the VAE server over V1-AE reference point. The V2X application specific client communicates with V2X application specific server over V1-APP reference point.

The VAE client of V2X UE2 communicates with VAE client of V2X UE1 over V5-AE reference point. The V2X application specific client of V2X UE2 communicates with VAE client of V2X UE1 over V5-APP reference point. The V2X UE1 can also act as a UE-to-network relay to enable VAE client on V2X UE2 to access VAE server over V1-AE reference point and to enable V2X application specific client on V2X UE2 to access V2X application specific server over V1-APP reference point.

A V1-AE message can be sent over unicast, transparent multicast via xMB, transparent multicast via MB2. The non-transparent multicast via xMB is triggered by a V1-AE message. Multicast distribution can be supported by both transparent and non-transparent multicast modes. The VAE server interacts with the 3GPP network systems 300 over V2, MB2, xMB, Rx and T8 reference points. The EPS and 5GS are considered as the 3GPP network systems. While the traditional vehicle platooning approaches are limited to organized platoons for fleet management i.e., platoon formation requires a pre-determined set of Following Vehicles and a Platoon Leader, this disclosure focuses on the V2X architecture and methods, enable the vehicles to dynamically form a platoon. Dynamic platoons can be formed with the assistance of a V2X AS or independently by the V2X UEs if they are not connected to the network.

Figure 18:
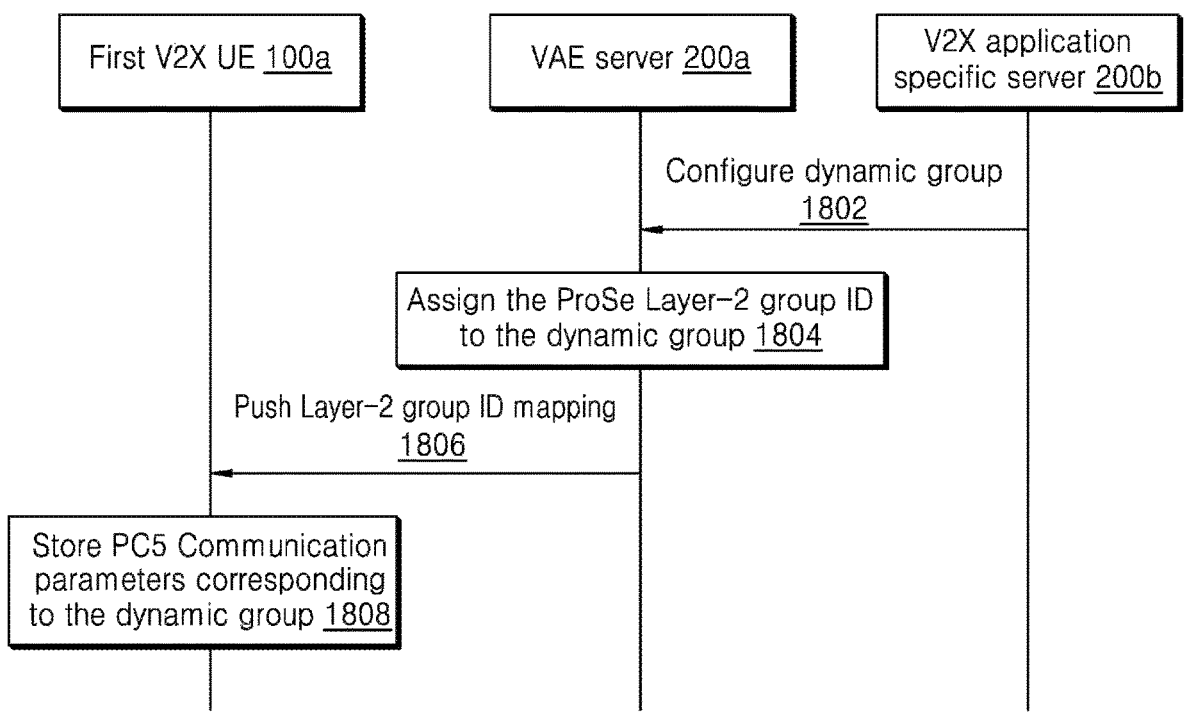
FIG. 18 is a sequential diagram illustrating step by step procedures for handling dynamic group creation, according to an embodiment of the disclosure.

FIG. 18 is a sequential diagram illustrating step by step procedure for on-network dynamic group creation, according to an embodiment of the disclosure.

At operation 1802, the V2X application specific server 200b requests the VAE server 200a to configure dynamic group corresponding to the dynamic group information. At operation 1804, in order to enable PC5 communication, the VAE server 200a assigns ProSe Layer-2 Group ID to the received dynamic group information from the available ProSe Layer-2 Group ID pool. At operation 1806, the VAE server 200a triggers a push request including ProSe Layer-2 Group ID corresponding to the dynamic group information to the VAE client 140. At operation 1808, the VAE client 140 stores the received PC5 communication parameters corresponding to the dynamic group information received from the VAE server 200a.

In an embodiment, the dynamic group is defined at the V2X application specific server 200b with the V2X UE 100 of the VAE client 140 assigned as dynamic group leader.

In an embodiment, the VAE server 200a has a pool of the ProSe Layer-2 Group IDs that can be assigned to the dynamic groups.

In an embodiment, the VAE client 140 may further announce the dynamic group information including the corresponding ProSe Layer-2 Group ID to the other VAE clients within the PC5 communication proximity on a PC5 channel dedicated for V5-AE communications, enabling more V2X UEs to join the dynamic group.

Figure 19:
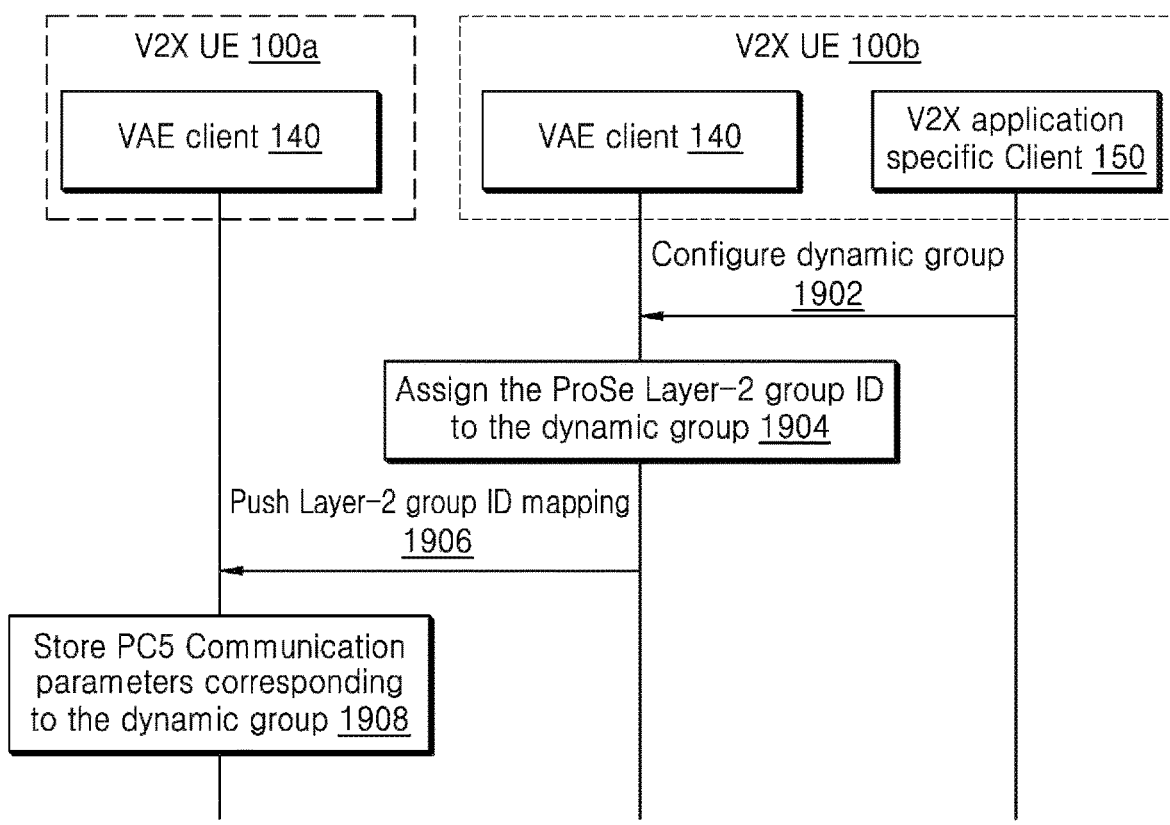
FIG. 19 is another sequential diagram illustrating step by step procedures for handling dynamic group creation, according to an embodiment of the disclosure.

FIG. 19 is a sequential diagram illustrating step by step procedure for off-network dynamic group creation, according to an embodiment of the disclosure.

At operation 1902, the V2X application specific client 2 requests the VAE client 2 to configure dynamic group corresponding to the dynamic group information. At operation 1904, each VAE client generates ProSe Layer-2 Group ID independently based on the provisioned ProSe Layer-2 Group ID(s) generation rules for its group information or the VAE client 2 assigns ProSe Layer-2 Group ID from the pool of configured ProSe Layer-2 Group IDs. At 1906, the VAE client may further announce the dynamic group information including the corresponding ProSe Layer-2 Group ID to the other VAE clients within the PC5 communication proximity on a PC5 channel dedicated for V5-AE communications, enabling more V2X UEs to join the dynamic group. In an embodiment, at operation 1906, the VAE client 140 announcing the dynamic group information indicates itself as the platoon Leader of that dynamic group.

At operation 1908, the VAE client stores the PC5 communication parameters corresponding to the dynamic group information received from another VAE client.

In an embodiment, the VAE client(s) are configured with the unique pool of ProSe Layer-2 Group IDs, when they are in coverage area of the VAE server 200a.

Figure 20:
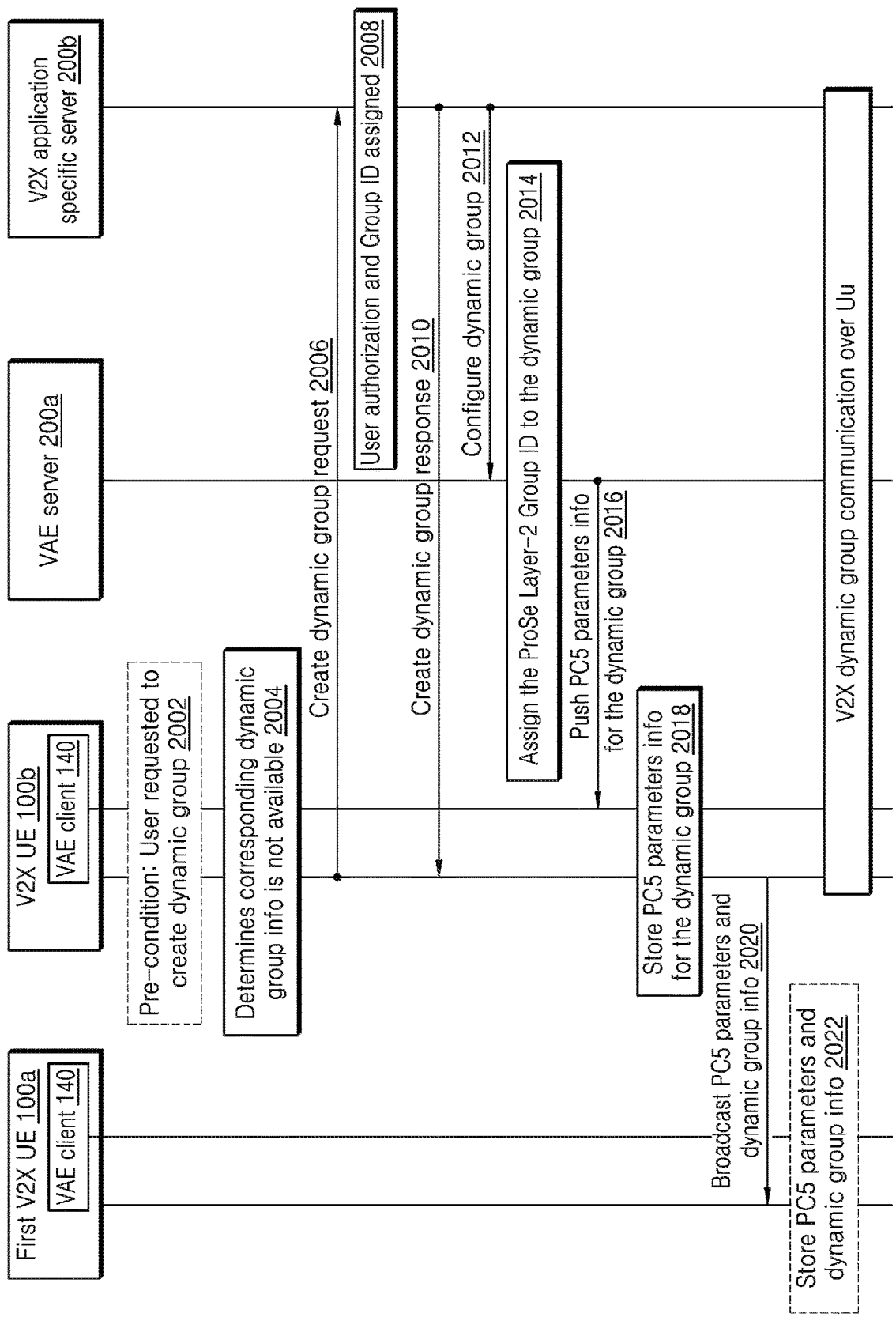
FIG. 20 is a sequential diagram illustrating step by step procedures for creating a dynamic group for Uu communication, according to an embodiment of the disclosure.

FIG. 20 is a sequential diagram illustrating step by step procedure for creating the dynamic group for Uu communication, according to an embodiment of the disclosure.

Referring to FIG. 20, the V2X application specific server 200b is responsible for V2X dynamic group creation (including information like group ID assignment, defining group criteria), membership management (e.g. user authorization), checking if there is an existing dynamic group for the defined group criteria, regulating and distribution of dynamic group communication over Uu interface and interactions with the VAE server 200a. The VAE server 200a is responsible for assigning the ProSe Layer-2 Group ID from the ProSe Layer-2 Group ID pool corresponding to the V2X application specific server provided dynamic group creation information and then delivering the assignment of the ProSe Layer-2 Group ID and the V2X dynamic group creation information to the VAE client 140 over V1 reference point.

Pre-condition: The V2X user at the second V2X UE 100b requested to create the dynamic group including the information required for defining the group criteria as shown at operation 2002.

At operation 2004, the second V2X UE 100b determines whether there is an existing dynamic group already defined corresponding to the group information provided by the V2X user.

If the corresponding dynamic group does not exist then, at operation 2006, the second V2X UE 100b sends the create dynamic group request including the V2X user provided group information to the V2X application specific server 200b.

At operation 2008, the V2X application specific server 200b checks for the V2X user authorization to create the dynamic group and also if there is an existing dynamic group already defined corresponding to the group information provided by the V2X user. If the corresponding dynamic group does not exist to the group information provided by the V2X user, the V2X application specific server 200b creates the new dynamic group assigning group ID, adding V2X user as group member and defining the group criteria.

At operation 2010, the V2X application specific server 200b includes relevant information from the dynamic group created in create dynamic group response and sends to the second V2X UE 100b.

At operation 2012, the V2X application specific server 200b requests the VAE server 200a to configure the dynamic group for PC5 communication including the dynamic group ID, the V2X group member and the group criteria.

At operation 2014, in order to enable the PC5 communication, the VAE server 200b assigns the ProSe Layer-2 Group ID from the ProSe Layer-2 Group ID pool corresponding to the V2X application specific server 200b provided dynamic group creation information.

At operation 2016, the VAE server 200a triggers a push request including the PC5 parameters and the dynamic group creation information to the VAE client 140 of the second V2X UE 100b requesting to create the dynamic group.

At operation 2018, the VAE client 140 stores the received PC5 parameters in the second V2X UE 100b.

At operation 2020, the VAE client 140 broadcasts PC5 parameters and the dynamic group creation information using the ProSe Layer-2 ID pre-configured per V2X service, received by the V2X UEs 100a-110n in the PC5 communication proximity.

At operation 2022, upon receiving the broadcast, the VAE client 140 stores the received PC5 parameters and the dynamic group creation information in the V2X UE 100a.

The VAE client(s) 140 receiving the acknowledgement for the dynamic group creation may engage in the group communication over Uu interface.

Figure 21:
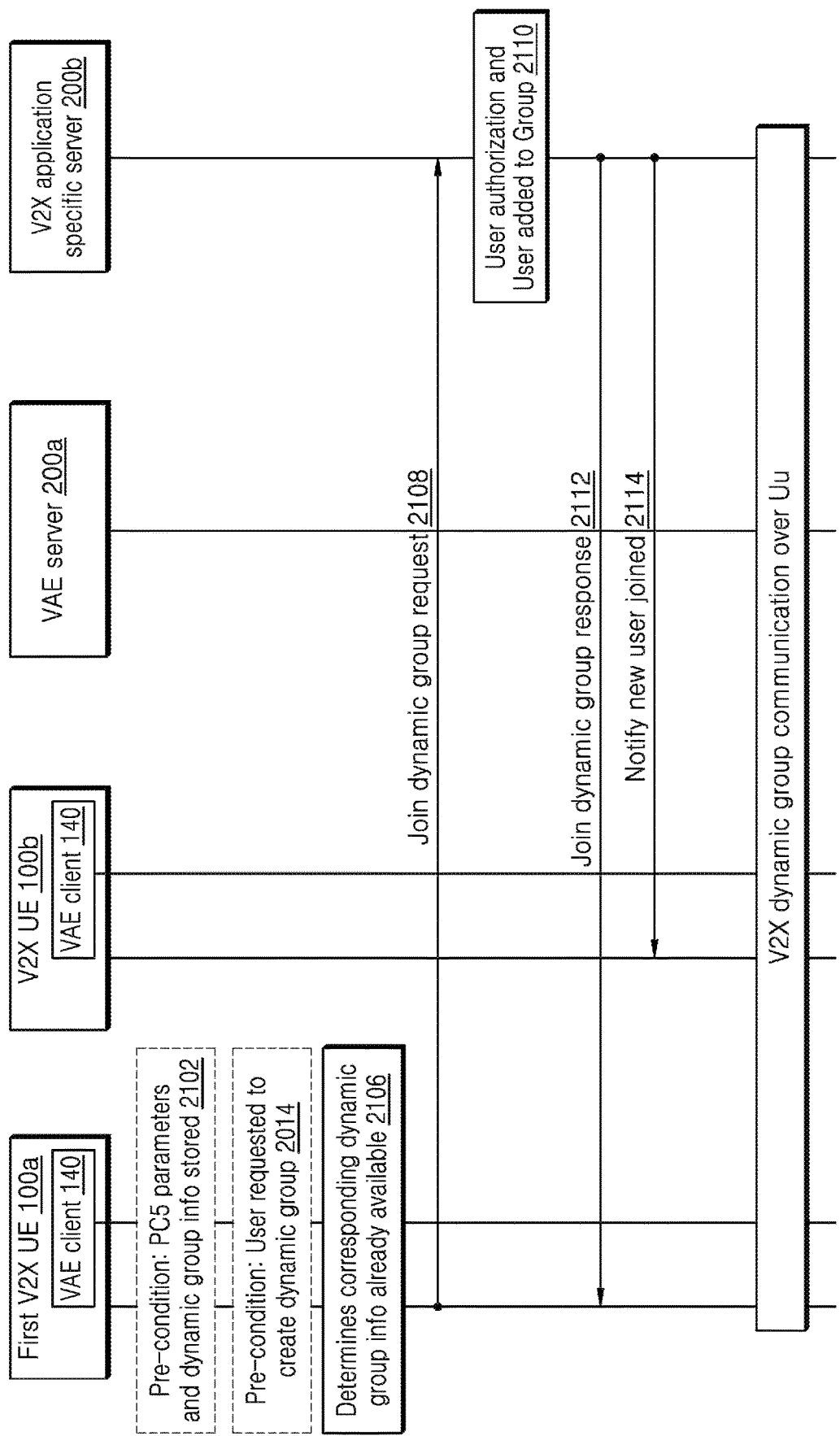
FIG. 21 is a sequential diagram illustrating step by step procedures for joining the dynamic group for Uu communication, according to an embodiment of the disclosure.

FIG. 21 is a sequential diagram illustrating step by step procedure for joining the dynamic group for Uu communication, according to an embodiment of the disclosure.

Pre-condition: Upon receiving the broadcast, the first V2X UE 100a has stored the received PC5 parameters and the dynamic group creation information as shown at operation 2102.

Pre-condition: The V2X user of the first V2X UE 100a requested to create the dynamic group including the information required for defining the group criteria as shown at operation 2104.

At operation 2106, the first V2X UE 100a determines whether there is an existing dynamic group already defined corresponding to the group information provided by the V2X user at second V2X UE 100b.

If the corresponding dynamic group is determined then at operation 2108, the 100a sends the join dynamic group request including the V2X group ID to the V2X application specific server 200b.

At operation 2110, the V2X application specific server 200b checks for the V2X user authorization to join the existing dynamic group. If the V2X user is authorized to join the dynamic group, the V2X application specific server 200b adds the V2X user as the group member.

At operation 2112, the V2X application specific server 200b acknowledges the first V2X UE 100a in the Join dynamic group response.

At operation 2114, the V2X application specific server 200b notifies about the user associated with the first V2X UE 100a joining the dynamic group to all the existing members of the group.

The VAE client(s) 140 which are members of the dynamic group may engage in the group communication over the Uu interface.

Figure 22:
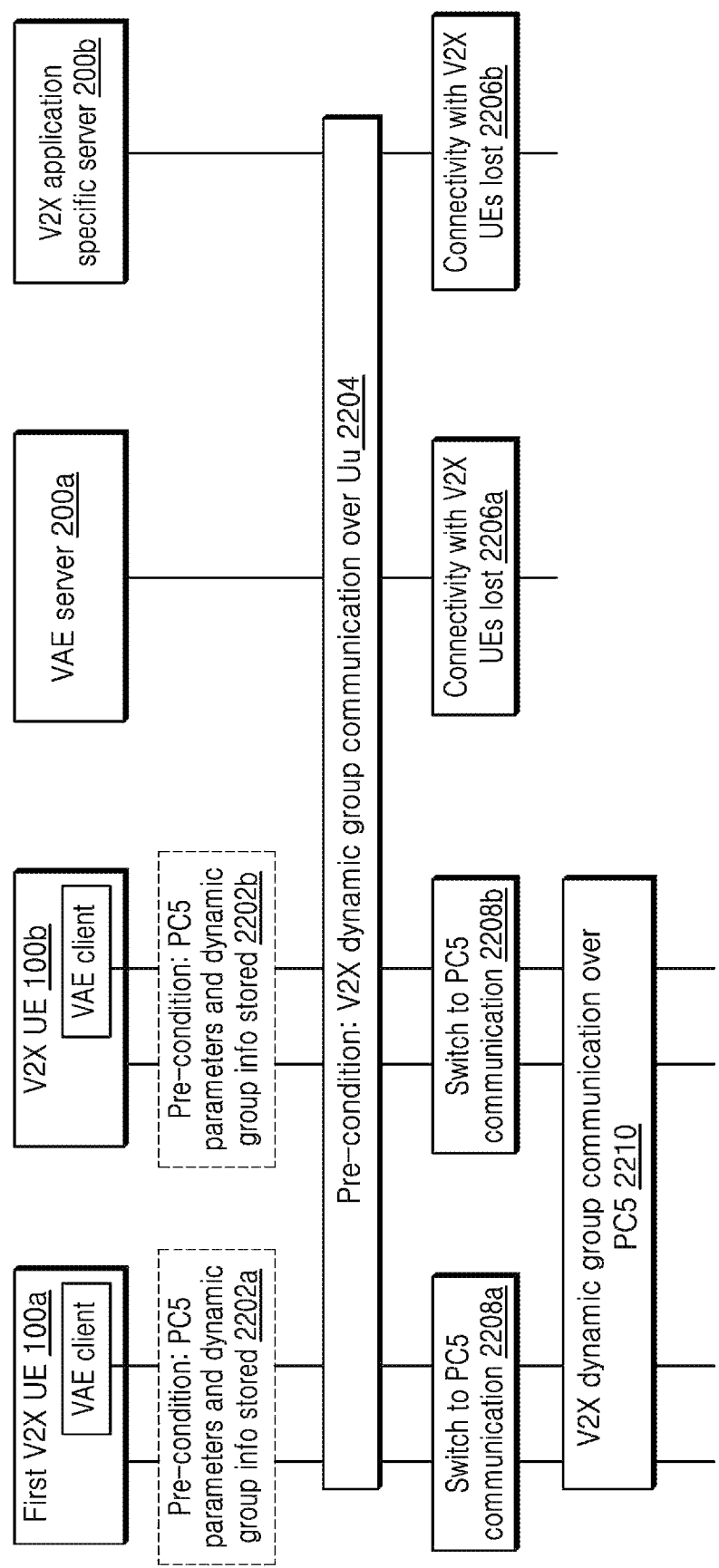
FIG. 22 is a sequential diagram illustrating step by step procedures for service continuity of the dynamic group when moving from Uu communication to PC5 communication, according to an embodiment of the disclosure.

FIG. 22 is a sequential diagram illustrating step by step procedure for service continuity of the dynamic group when moving from Uu communication to PC5 communication, according to an embodiment of the disclosure.

Pre-condition: Upon receiving the broadcast, the first and second V2X UEs 100a and 100b has stored the received PC5 parameters and the dynamic group creation information as shown at operations 2202a and 2202b.

Pre-condition: The V2X UEs 100a and 100b which are members of the dynamic group may be engage in the group communication over the Uu interface as shown at operations 2204a and 2204b.

At operations 2206a and 2206b, the V2X UEs 100a and 100b have moved to an area where they have lost connectivity with the system 1000a.

At operations 2208a and 2208b, the V2X service requires V2X UEs 100a and 100b of the dynamic group communicating over Uu interface to support service continuity within the dynamic group members who have moved to an area where there is no coverage over PC5 interface. So the V2X UEs 100a and 100b of the dynamic group switch to PC5 communication mode using the parameters configured at operations 2202a and 2202b.

At operation 2210, the VAE client(s) 140 which are members of the dynamic group and switched to PC5 communication mode may continue their group communication over PC5 interface.

Figure 23:
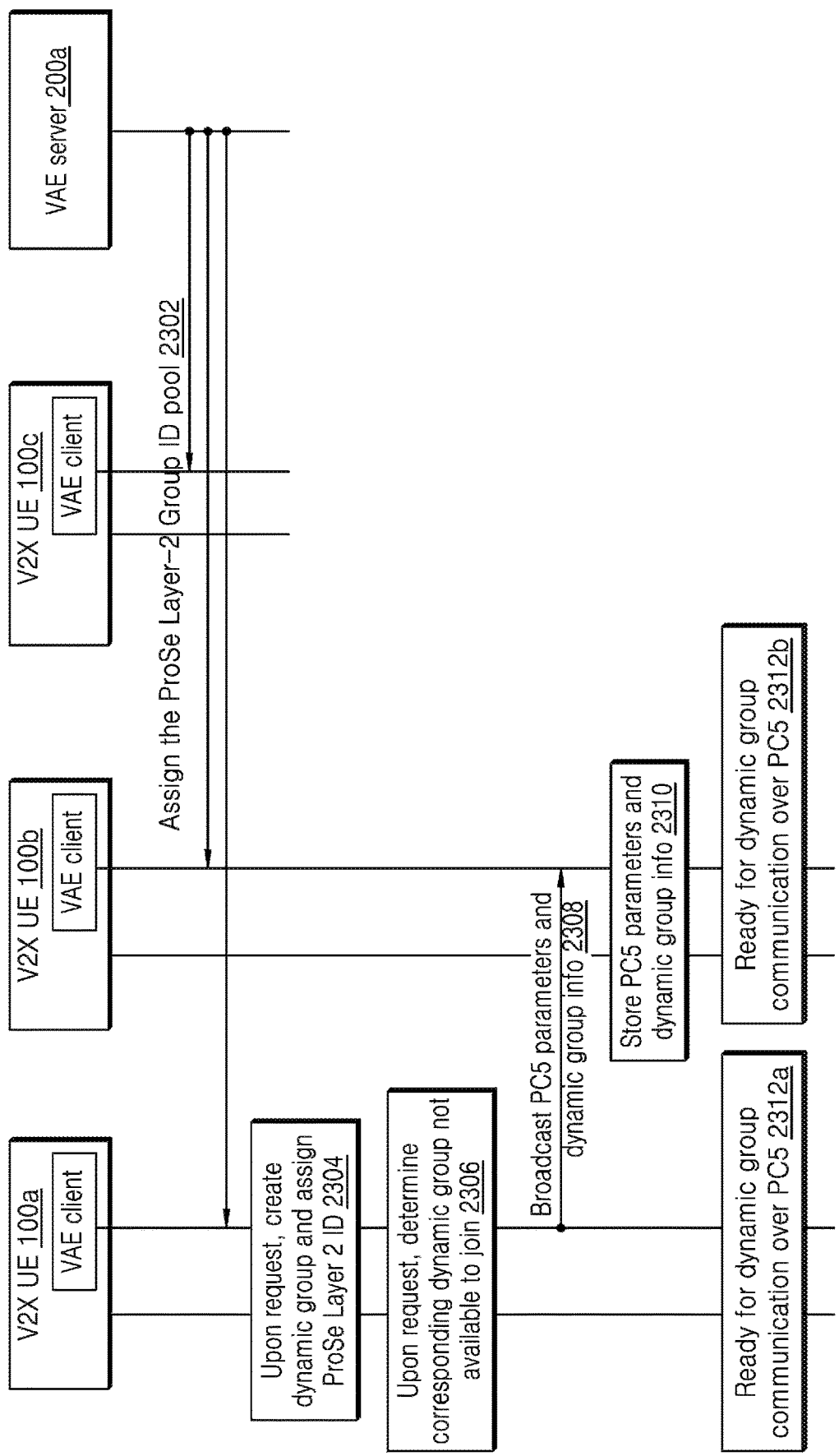
FIG. 23 is a sequential diagram illustrating step by step procedures for creating the dynamic group for PC5 communication, according to an embodiment of the disclosure.

FIG. 23 is a sequential diagram illustrating step by step procedures for creating the dynamic group for PC5 communication, according to an embodiment of the disclosure.

At operation 2302, the V2X UEs 100a-100n are configured with unique pool of ProSe Layer 2 IDs when V2X UEs 100a-100n are still in the coverage area of the VAE server 200a.

At operation 2304, the V2X user associated with the first V2X UE 100a requested to create the dynamic group providing the information required for defining the group criteria, when the first V2X 100a is not in the coverage area of the system 1000a. The first V2X UE 100a determines whether there is an existing dynamic group already defined corresponding to the group information provided by the V2X user.

At operation 2306, if the corresponding dynamic group does not exist, the VAE client 140 at the first V2X UE 100a assigns ProSe Layer-2 Group ID from the ProSe Layer-2 Group ID pool corresponding to the V2X user provided dynamic group creation information.

At operation 2308, the VAE client 140 at the first V2X UE 100a triggers the broadcast request including the PC5 parameters and dynamic group creation information using the ProSe Layer-2 ID pre-configured per V2X service and received by the V2X UEs 100b-100n in the PC5 communication proximity.

At operation 2310, upon receiving the broadcast, the VAE client 140 stores the received PC5 parameters and the dynamic group creation information in the first V2X UE 100a.

At operation 2312a and 2312b, the VAE client(s) 140 receiving the PC5 parameters for the dynamic group may engage in the group communication over the PC5 interface.

Figure 24:
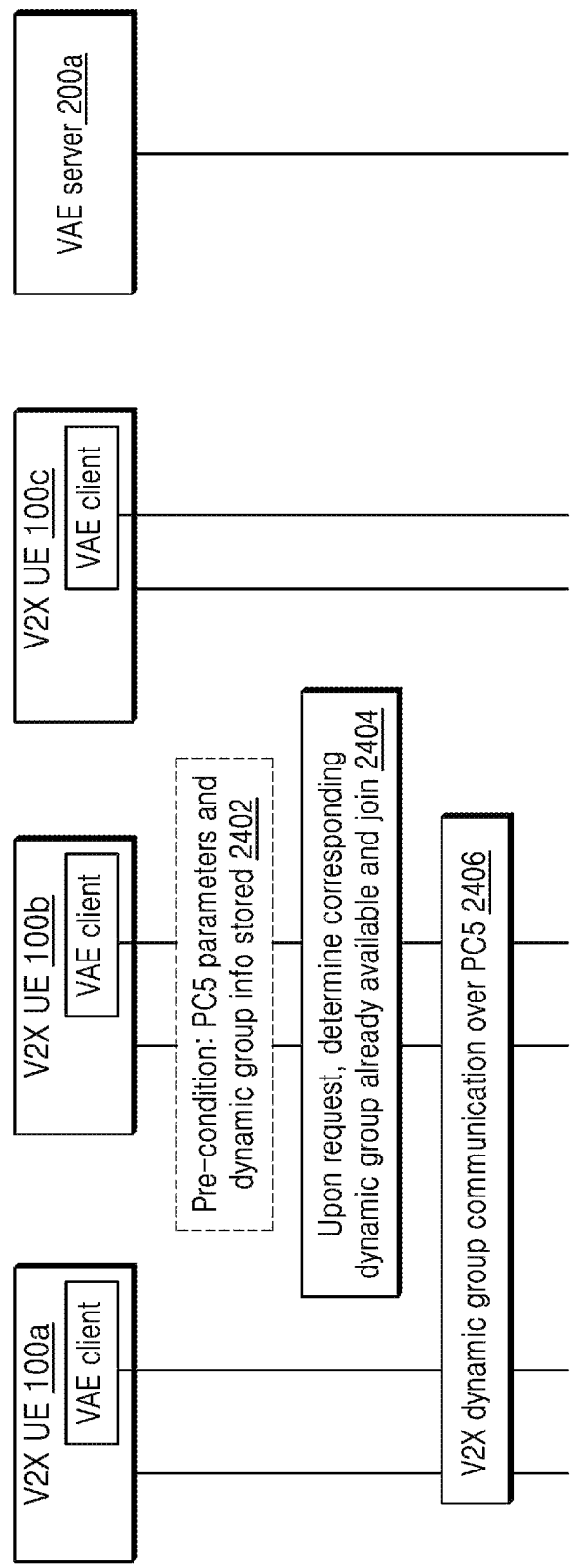
FIG. 24 is a sequential diagram illustrating step by step procedures for joining the dynamic group for PC5 communication, according to an embodiment of the disclosure.

FIG. 24 is a sequential diagram illustrating step by step procedures for joining the dynamic group for the PC5 communication, according to an embodiment of the disclosure.

Pre-condition: Upon receiving the broadcast, the VAE client 140 has stored the received PC5 parameters and the dynamic group creation information in the second V2X UE 100b as shown at operation 2402.

At operation 2404, the V2X user at the second V2X UE 100b requested to create the dynamic group providing the information required for defining the group criteria, when the first V2X UE 100a is not in the coverage area of the system 1000b. The second V2X UE 100b determines whether there is an existing dynamic group already defined corresponding to the group information provided by the V2X user.

If the corresponding dynamic group exists then at operation 2406, the VAE client 140 at the second V2X UE 100b use the stored PC5 parameters for the dynamic group and may engage in the group communication over PC5 interface.

Figure 25:
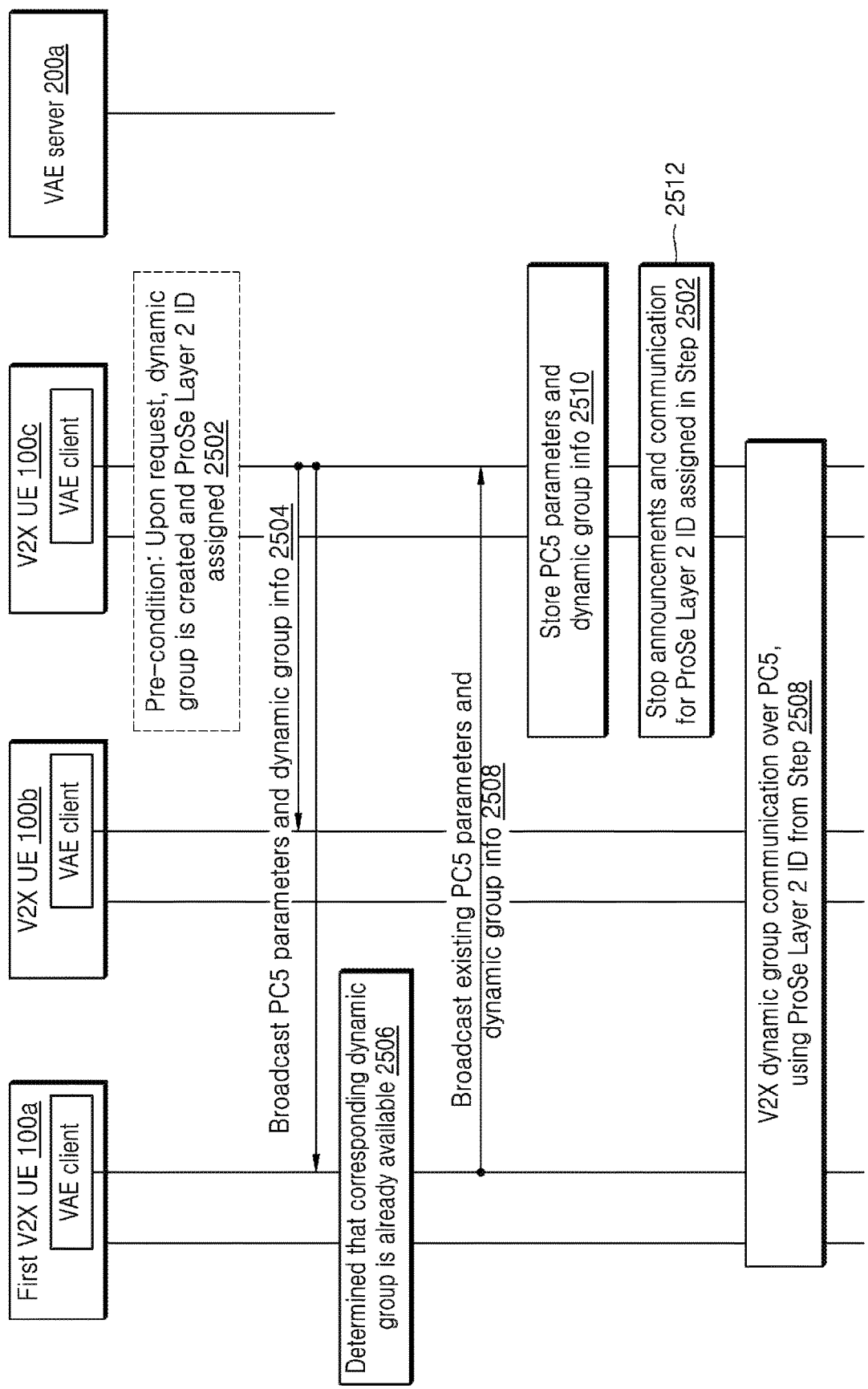
FIG. 25 is a sequential diagram illustrating step by step procedures for merging the dynamic groups during PC5 communication, according to an embodiment of the disclosure.

FIG. 25 is a sequential diagram illustrating step by step procedures for merging the dynamic groups during PC5 communication, according to an embodiment of the disclosure.

Pre-condition: As per V2X user at the V2X UE 1's request (not in the coverage area of the system 1000a), the dynamic group has been created and broadcasted PC5 parameters and dynamic group creation information over the PC5 interface. However, the VAE client 140 of the third V2X UE 100c was not in proximity of the PC5 communication with first V2X UE 100a and has not received the broadcast from the VAE client 140 of the first V2X UE 100a as shown at operation 2502.

The V2X user at the third V2X UE 100c requested to create the dynamic group providing the information required for defining the group criteria. The third V2X UE 100c determines that there is no existing dynamic group already defined corresponding to the group information and assigns the ProSe Layer-2 Group ID from the ProSe Layer-2 Group ID pool.

At operation 2504, the VAE client 140 of the third V2X UE 100c triggers the broadcast request including the PC5 parameters and dynamic group creation information using the ProSe Layer-2 ID pre-configured per V2X service and received by the V2X UEs 100a and 100b in the PC5 communication proximity.

At operation 2506, upon receiving the broadcast from the third V2X UE 100c, the VAE client 140 at the first V2X UE 100a determines that there is an already existing dynamic group for the same group criteria.

At operation 2508, the VAE client 140 of the first V2X UE 100a triggers the broadcast request including PC5 parameters and dynamic group creation information using the ProSe Layer-2 ID pre-configured per V2X service and received by the V2X UEs in the PC5 communication proximity including the third V2X UE 100c.

The VAE client 140 of the third V2X UE 100c analyses that there is an existing dynamic group and stops using ProSe Layer 2 ID that was assigned in operation 2504.

At operation 2510, the VAE client 140 stores the received PC5 parameters and the dynamic group creation information in the first V2X UE 100a.

At operation 2512, the V2X UEs 100a-100c engage in dynamic group communication over the PC5 interface using the ProSe Layer 2 ID that was assigned in operation 2502.

Figure 26:
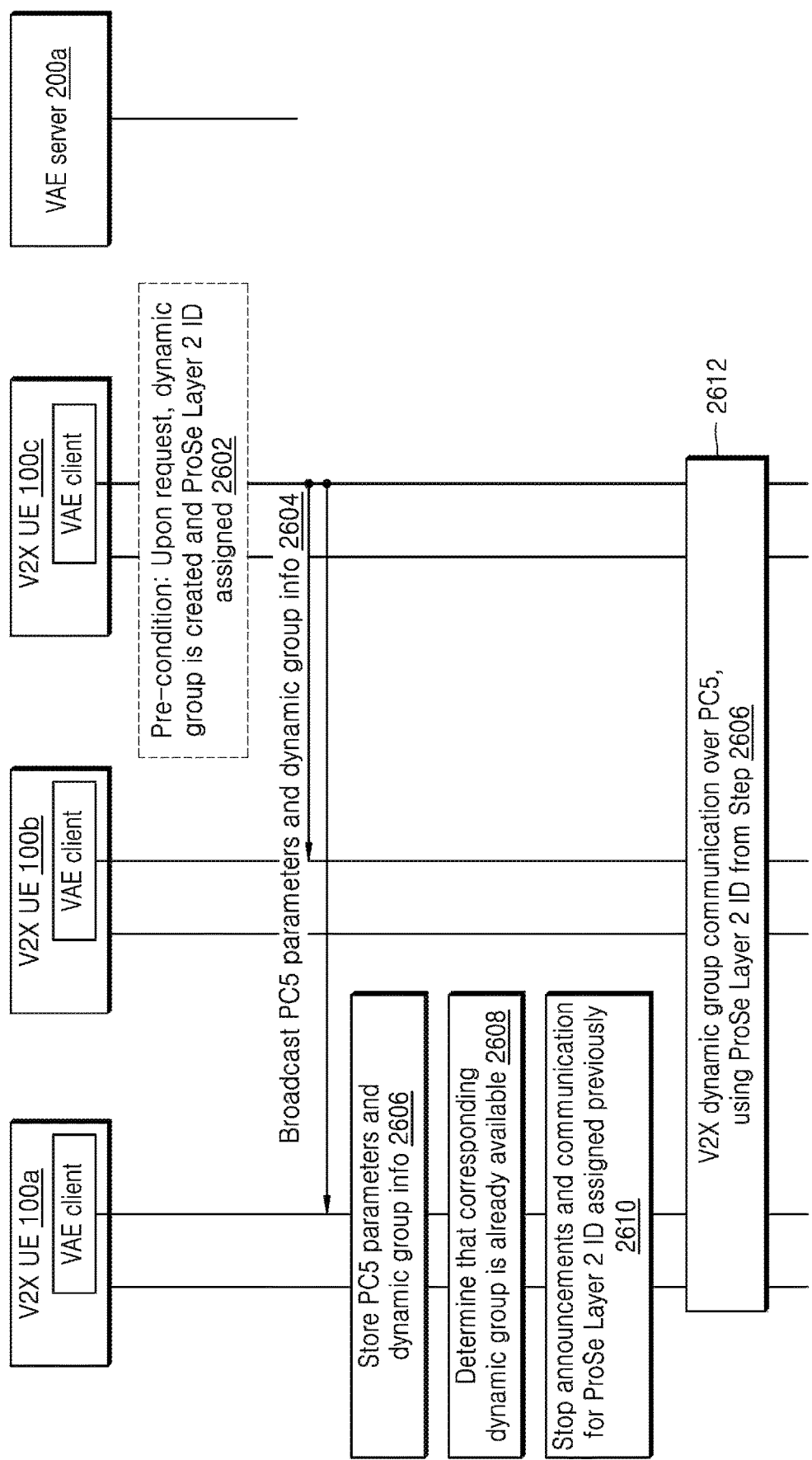
FIG. 26 is a sequential diagram illustrating step by step procedures for merging the dynamic groups during PC5 communication, according to an embodiment of the disclosure.

FIG. 26 is a sequential diagram illustrating step by step procedures for merging the dynamic groups during PC5 communication, according to an embodiment of the disclosure.

Pre-condition: As per V2X user associated with the first V2X UE 100a request (not in the coverage area of the system 1000a), the dynamic group has been created and broadcasted PC5 parameters and dynamic group creation information over PC5 interface. However, the VAE client 140 of the third V2X UE 100c was not in proximity of PC5 communication with the first V2X UE 100a and has not received the broadcast from the VAE client 140 of the first V2X UE 100a as shown at operation 2602.

At operation 2604, the V2X user at the third V2X UE 100c requested to create a dynamic group providing the information required for defining the group criteria. The third V2X UE 100c determines that there is no existing dynamic group already defined corresponding to the group information and assigns a ProSe Layer-2 Group ID from the ProSe Layer-2 Group ID pool.

At operation 2606, the VAE client 140 at the V2X UE 100c triggers a broadcast request including PC5 parameters and dynamic group creation information using the ProSe Layer-2 ID pre-configured per V2X service and received by the V2X UEs in the PC5 communication proximity.

At operation 2608, upon receiving the broadcast from the third V2X UE 100c, the VAE client 140 at the V2X UE 100a determines that there is an already existing dynamic group for the same group criteria.

At operation 2610, the VAE client 140 at the first V2X UE 100a stops using ProSe Layer 2 ID that was assigned in operation 2602. The VAE client 140 at the V2X UE 100a stores the received PC5 parameters and the dynamic group creation information in the V2X UE.

At operation 2612, the V2X UEs 100a-100c engage in dynamic group communication over PC5 interface using the ProSe Layer 2 ID that was assigned in operation 2608.

Figure 27:
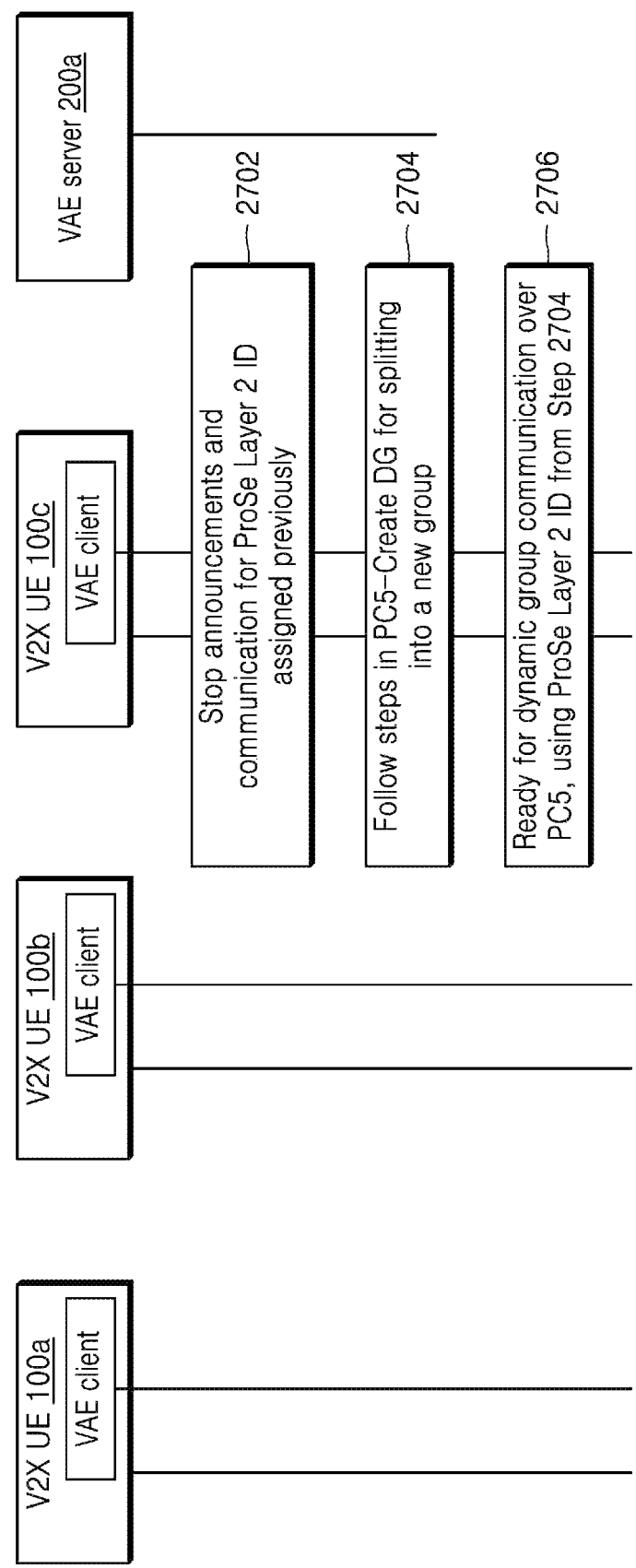
FIG. 27 is a sequential diagram illustrating step by step procedures for splitting the dynamic group during PC5 communication, according to an embodiment of the disclosure.

FIG. 27 is a sequential diagram illustrating step by step procedures for splitting the dynamic group during PC5 communication, according to an embodiment of the disclosure.

Pre-condition: The VAE client(s) 140 are engaged in the dynamic group communication over PC5 interface using a ProSe Layer-2 ID corresponding to a dynamic group as shown at operation 2702.

At operation 2704, the VAE client 140 at the first V2X UE 100*a* stops using ProSe Layer 2 ID that was being used for communication in operation 2702.

At operation 2706, upon decision from V2X user at the third V2X UE 100*c* to create a new group for the same group criteria, steps in FIG. 23 are followed which results in assignment of new ProSe Layer 2 group ID. The third V2X UE 100*c* engages in dynamic group communication over PC5 interface using the ProSe Layer 2 ID that was assigned in operation 2706.

Figure 28:
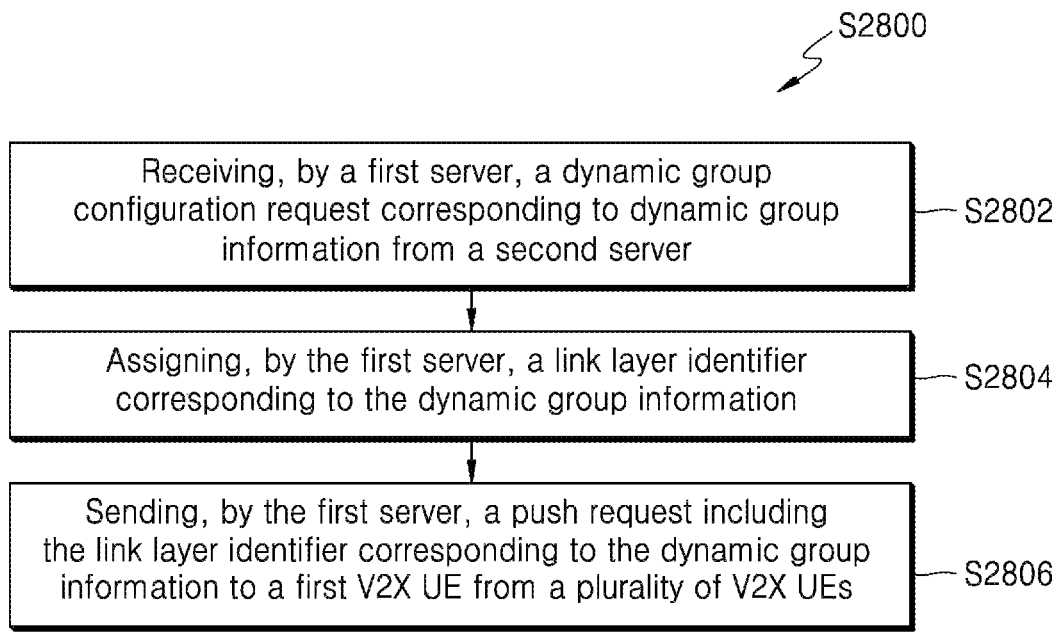
FIG. 28 is a flow chart illustrating a method for handling dynamic group creation in the V2X system, according to an embodiment of the disclosure.

FIG. 28 is a flow chart S2800 illustrating a method for handling dynamic group creation in a V2X system 1000*a*, according to an embodiment of the disclosure.

Operations S2802-S2806 are performed by the processor 210. At operation S2802, the method includes receiving the dynamic group configuration request corresponding to dynamic group information from the second server 200*b*. At operation S2804, the method includes assigning the link layer identifier corresponding to the dynamic group information. At operation S2804, the method includes sending the push request including the link layer identifier corresponding to the dynamic group information to the first V2X UE 100*a* from the plurality of V2X UEs 100*a*-100*n*.

Figure 29:
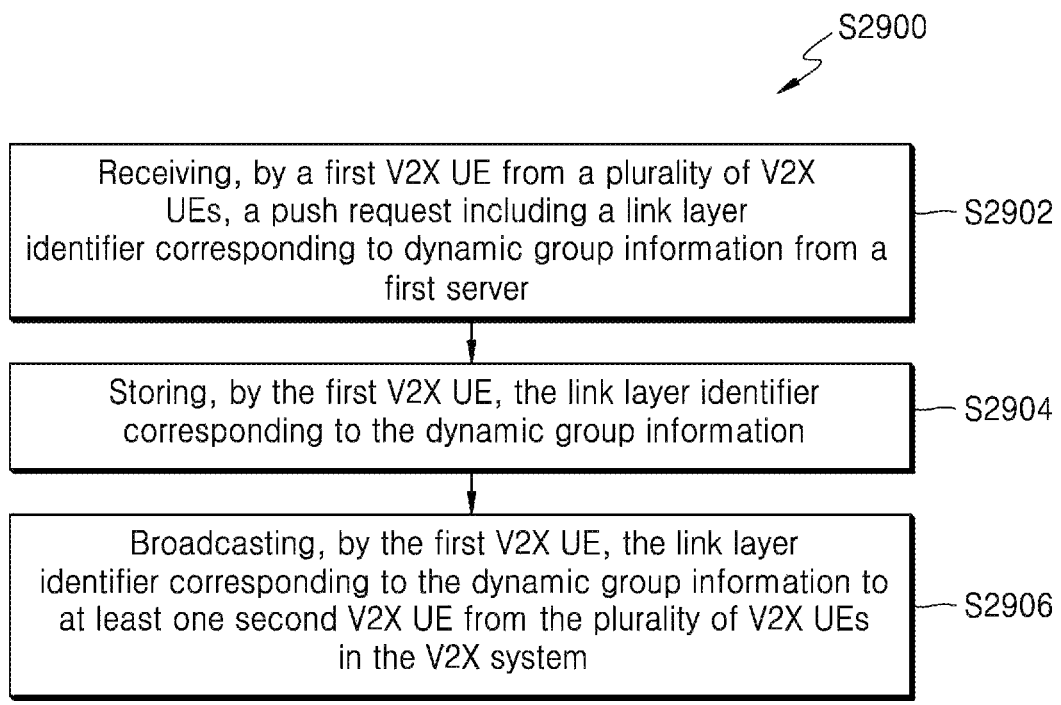
FIG. 29 is a flow chart illustrating a method for handling dynamic group creation in the V2X system, according to an embodiment of the disclosure.

FIG. 29 is a flow chart S2900 illustrating a method for handling dynamic group creation in the V2X system 1000*a*, according to an embodiment of the disclosure.

Operations S2902-S2906 are performed by the processor 110. At operation S2902, the method includes receiving the push request including the link layer identifier corresponding to dynamic group information from the first server 200*a*. At operation S2904, the method includes storing the link layer identifier corresponding to the dynamic group information. At operation S2906, the method includes broadcasting the link layer identifier corresponding to the dynamic group information to at least one second V2X UE from the plurality of V2X UEs 100*a*-100*n* in the V2X system 1000*a*.

Figure 30:
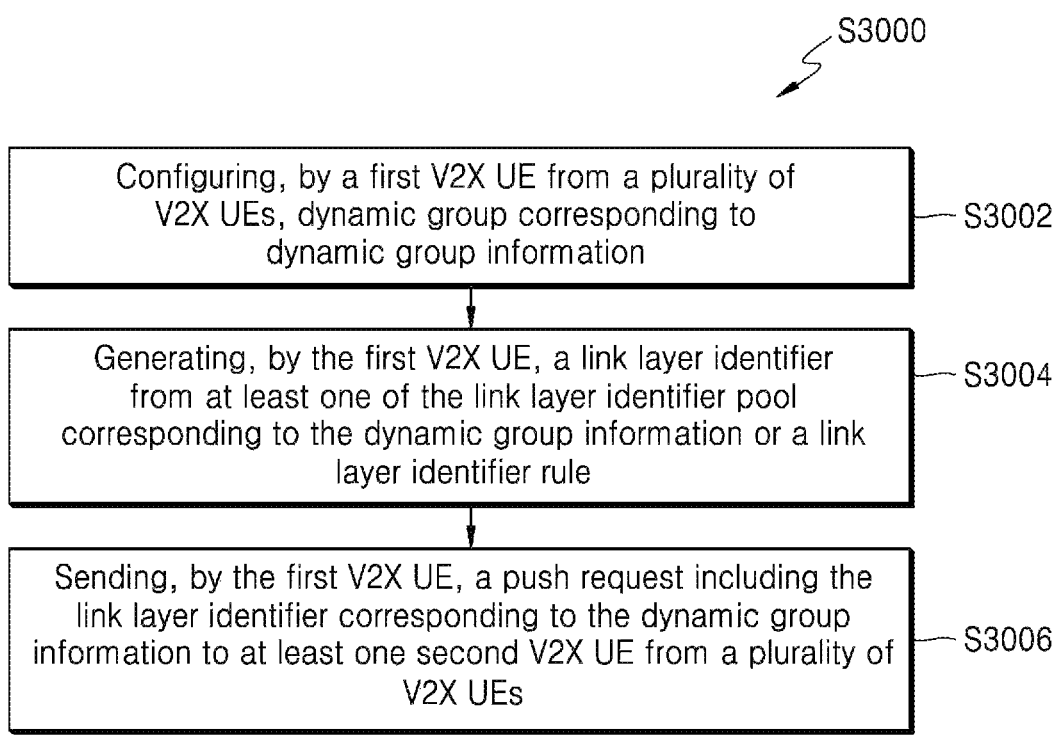
FIG. 30 is a flow chart illustrating a method for handling dynamic group creation in the V2X system, according to an embodiment of the disclosure.

FIG. 30 is a flow chart S3000 illustrating a method for handling dynamic group creation in the V2X system 1000*b*, according to an embodiment of the disclosure.

Operations S3002-S3006 are performed by the processor 110. At operation S3002, the method includes configuring dynamic group corresponding to dynamic group information. At operation S3004, the method includes generating the link layer identifier from at least one of the link layer identifier pool corresponding to the dynamic group information or the link layer identifier rule. At operation S3006, the method includes sending the push request including the link layer identifier corresponding to the dynamic group information to at least one second V2X UE from the plurality of V2X UEs 100*a*-100*n*.

Figure 31:
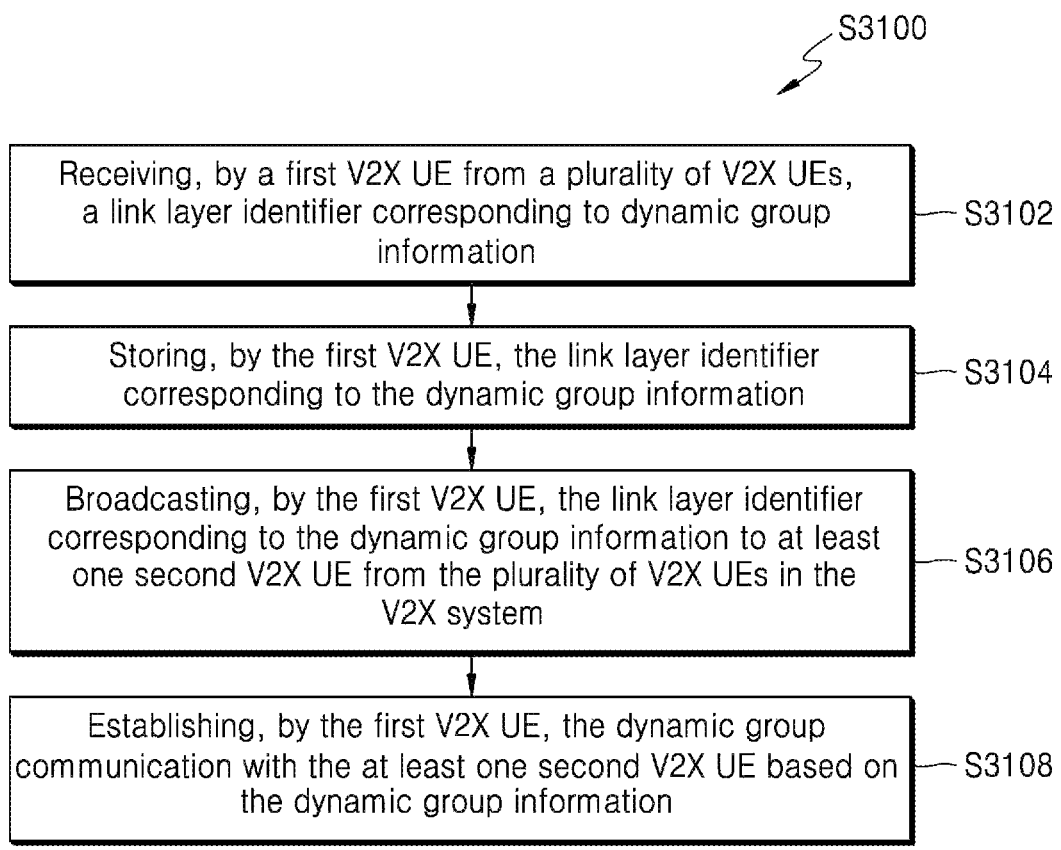
FIG. 31 is a flow chart illustrating a method for handling dynamic group creation in the V2X system, according to an embodiment of the disclosure.

FIG. 31 is a flow chart S3100 illustrating a method for handling dynamic group creation in the V2X system 1000*b*, according to an embodiment of the disclosure.

Operations S3102-S3108 are performed by the processor 110. At operation S3102, the method includes receiving the link layer identifier corresponding to dynamic group information. At operation S3104, the method includes storing the link layer identifier corresponding to the dynamic group information. At S3106, the method includes broadcasting the link layer identifier corresponding to the dynamic group information to at least one second V2X UE from the plurality of V2X UEs 100*a*-100*n* in the V2X system 1000. At operation S3108, the method includes establishing, by the first V2X UE 100*a*, the dynamic group communication with the at least one second V2X UE based on the dynamic group information.

Figure 32:
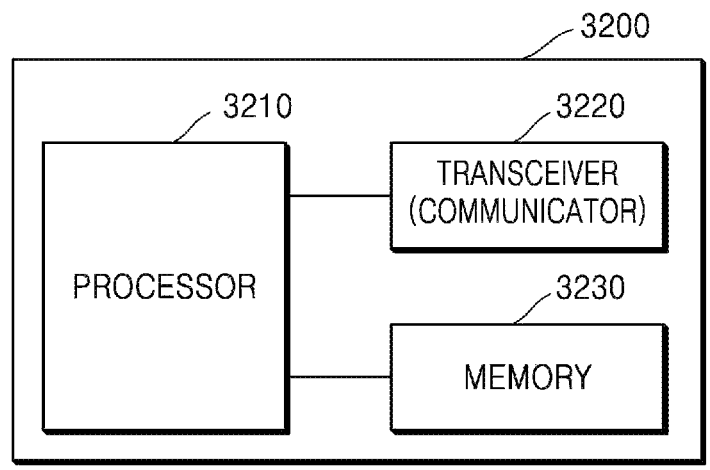
FIG. 32 is a block diagram of UE (V2X UE), according to an embodiment of the disclosure.

FIG. 32 is a block diagram of a V2X UE, according to an embodiment of the disclosure.

Referring to the FIG. 32, the V2X UE 3200 may include a processor 3210, a transceiver (e.g., a communicator) 3220 and a memory 3230. However, all of the illustrated components are not essential. The V2X UE 3200 may be implemented by more or less components than those illustrated in FIG. 32. In addition, the processor 3210 and the transceiver 3220 and the memory 3230 may be implemented as a single chip according to another embodiment. The V2X UE 3200 may correspond to V2X UE of FIG. 3. The processor 3210 may correspond to the processor 110 of FIG. 5. The aforementioned components will now be described in detail.

The processor 3210 may include one or more processors or other processing devices that control the proposed function, process, and/or method. Operation of the user equipment 3200 may be implemented by the processor 3210. The processor may operate to perform the embodiments of the disclosure and the operation of the processor 3210 may correspond to the processor 110 of FIG. 5.

The transceiver (e.g., a communicator) 3220 may include a RF transmitter for up-converting and amplifying a transmitted signal, and a RF receiver for down-converting a frequency of a received signal. However, according to another embodiment, the transceiver 3220 may be implemented by more or less components than those illustrated in components.

The transceiver 3220 may be connected to the processor 3210 and transmit and/or receive a signal. The signal may include control information and data. In addition, the transceiver 3220 may receive the signal through a wireless channel and output the signal to the processor 3210. The transceiver 3220 may transmit a signal output from the processor 3210 through the wireless channel.

The memory 3230 may store the control information or the data included in a signal obtained by the V2X UE 3200. The memory 3230 may be connected to the processor 3210 and store at least one instruction or a protocol or a parameter for the proposed function, process, and/or method. The memory 3230 may include read-only memory (ROM) and/or RAM and/or hard disk and/or compact disc (CD)-ROM and/or digital versatile disc (DVD) and/or other storage devices.

The various actions, acts, blocks, steps, or the like in the flow diagrams S800-S1600 and S2800-S3100 may be performed in the order presented, in a different order or simultaneously. Further, in some embodiments, some of the actions, acts, blocks, steps, or the like may be omitted, added, modified, skipped, or the like without departing from the scope of the disclosure.

The embodiments disclosed herein can be implemented using at least one software program running on at least one hardware device and performing network management functions to control the elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by a vehicle to everything application enabler (VAE) client, for switching group communication mode in a vehicle to everything (V2X) system, comprising:
   identifying that a PC5 parameter for a dynamic group is configured;
   identifying that the VAE client is engaged with at least one V2X user equipment (UE) in a group communication over a Uu interface, wherein the at least one V2X UE is a member of the dynamic group;
   identifying that the VAE client engaged with the at least one V2X UE in the group communication over the Uu interface has lost connectivity with a network over the Uu interface;
   in response to identifying that the connectivity with the network over the Uu interface has been lost, switching, by the VAE client, the group communication mode over the Uu interface to a group communication mode over a PC5 interface based on the PC5 parameter configured for the dynamic group; and
   performing, by the VAE client, a group communication with the at least one V2X UE over the PC5 interface.

2. The method of claim 1, further comprising:
   receiving a push request including the PC5 parameter and dynamic group information from a VAE server; and
   storing the PC5 parameter.

3. The method of claim 2, further comprising:
   providing the PC5 parameter to at least one V2X UE.

4. The method of claim 3, wherein the VAE client communicates with at least one V2X UE on a PC5 channel dedicated for V5-AE communication.

5. The method of claim 2, wherein the dynamic group information includes at least one of a dynamic group identifier (ID), information about a group definition, or information about a group leader.

6. The method of claim 2, wherein the dynamic group information corresponds to a ProSe Layer-2 Group ID of the VAE client.

7. The method of claim 6, wherein the ProSe Layer-2 Group ID obtained from a pool of ProSe Layer-2 Group ID is assigned by the VAE server.

8. A vehicle to everything application enabler (VAE) client for switching group communication mode, in a vehicle to everything (V2X) system, comprising:
   a memory; and
   a processor, coupled with the memory, configured to:
      identify that a PC5 parameter for a dynamic group is configured,
      identify that the VAE client is engaged with at least one V2X user equipment (UE) in a group communication over a Uu interface, wherein the at least one V2X UE is a member of the dynamic group,
      identify that the VAE client engaged with the at least one V2X UE in the group communication over the Uu interface has lost connectivity with a network over the Uu interface,
      in response to the identification that the connectivity with the network over the Uu interface has been lost, switch the group communication mode over the Uu interface to a group communication mode over a PC5 interface based on the PC5 parameter configured for the dynamic group, and
      perform a group communication with the at least one V2X UE over the PC5 interface.

9. The VAE client of claim 8, wherein the processor is further configured to:
   receiving a push request including the PC5 parameter and dynamic group information from a VAE server; and
   storing the PC5 parameter.

10. The VAE client of claim 9, wherein the processor is further configured to:
    provide the PC5 parameter to at least one V2X UE.

11. The VAE client of claim 10, wherein the VAE client communicates with at least one V2X UE on a PC5 channel dedicated for V5-AE communication.

12. The VAE client of claim 9, wherein the dynamic group information includes at least one of a dynamic group identifier (ID), information about a group definition, or information about a group leader.

13. The VAE client of claim 9, wherein the dynamic group information corresponds to a ProSe Layer-2 Group ID of the VAE client.

14. The VAE client of claim 13, wherein the ProSe Layer-2 Group ID obtained from a pool of ProSe Layer-2 Group ID is assigned by the VAE server.

* * * * *